US012662304B2

(12) United States Patent
Clarke et al.

(10) Patent No.: US 12,662,304 B2
(45) Date of Patent: Jun. 23, 2026

(54) MULTI-LAYER PACKAGING PAD

(71) Applicant: Western Plastics, Inc., Mississauga (CA)

(72) Inventors: Thomas F. Clarke, Mississauga (CA); Michael Sean Hanstock, Bolton (CA)

(73) Assignee: Western Plastics Inc., Mississauga (CA)

( * ) Notice: Subject to any disclaimer, the term of this patent is extended or adjusted under 35 U.S.C. 154(b) by 0 days.

(21) Appl. No.: 18/899,418

(22) Filed: Sep. 27, 2024

(65) Prior Publication Data
US 2025/0091797 A1 Mar. 20, 2025

Related U.S. Application Data

(62) Division of application No. 17/506,779, filed on Oct. 21, 2021, now Pat. No. 12,134,511.
(Continued)

(51) Int. Cl.
*B65D 85/04* (2006.01)
*B32B 7/12* (2006.01)
(Continued)

(52) U.S. Cl.
CPC ............... *B65D 85/04* (2013.01); *B32B 7/12* (2013.01); *B32B 27/08* (2013.01); *B32B 27/12* (2013.01); *B32B 27/32* (2013.01); *B32B 2553/00* (2013.01)

(58) Field of Classification Search
CPC .......... B65D 85/04; B32B 7/12; B32B 27/32; B32B 2553/00; B32B 5/02; B32B 27/08; B32B 27/12
(Continued)

(56) References Cited

U.S. PATENT DOCUMENTS 3,222,237 A 12/1965 McKelvy
3,644,165 A * 2/1972 Chen ..................... B29C 70/086
428/110
(Continued)

FOREIGN PATENT DOCUMENTS

EP 0287272 A2 10/1988
EP 0317166 A2 5/1989
(Continued)

OTHER PUBLICATIONS

Plastc Wrap Article Search, pp. 1-61, dated Jun. 30, 2009.
(Continued)

*Primary Examiner* — Rafael A Ortiz
(74) *Attorney, Agent, or Firm* — Harness, Dickey & Pierce, P.L.C.

(57) ABSTRACT

A packaging system comprising one or more multi-layer packaging pads applied to a pre-wrapped object, such as a metal coil, at high wear locations for increased abrasion resistance. The multi-layer packaging pad includes first and second plies and optionally a slip sheet. The first and second plies are disposed in an overlapping arrangement and have first and second inside slip surfaces, respectively, that face one another. The first and second plies are connected along only a sealed perimeter of the multi-layer packaging pad to provide a slip region between the first and second plies. The first and a second inside slip surfaces are formulated to slide relative to one another such that an unconstrained middle portion of the second ply is moveable relative to the first ply. Associated methods of manufacture and use are also provided.

15 Claims, 12 Drawing Sheets

Related U.S. Application Data

(60) Provisional application No. 63/104,766, filed on Oct. 23, 2020.

(51) Int. Cl.
B32B 27/08 (2006.01)
B32B 27/12 (2006.01)
B32B 27/32 (2006.01)

(58) Field of Classification Search
USPC .......................................... 206/388, 71, 389
See application file for complete search history.

(56) References Cited

U.S. PATENT DOCUMENTS

| | | | |
|---|---|---|---|
| 3,649,405 A | 3/1972 | Osborn | |
| 3,762,983 A | 10/1973 | Osborn | |
| 4,285,998 A | 8/1981 | Thibodeau | |
| 4,340,558 A | 7/1982 | Hendrickson | |
| 4,348,445 A | 9/1982 | Craig | |
| 4,518,654 A | 5/1985 | Eichbauer et al. | |
| 4,592,938 A | 6/1986 | Benoit | |
| 4,820,589 A | 4/1989 | Dobreski et al. | |
| 4,833,017 A | 5/1989 | Benoit | |
| 4,948,651 A * | 8/1990 | DeBusk | B32B 5/26 428/110 |
| 4,996,094 A | 2/1991 | Dutt | |
| 5,013,595 A | 5/1991 | Parry | |
| 5,049,423 A | 9/1991 | German, Jr. | |
| 5,066,526 A | 11/1991 | German, Jr. | |
| 5,104,714 A | 4/1992 | Leiber et al. | |
| 5,175,049 A | 12/1992 | Huff et al. | |
| 5,208,096 A | 5/1993 | Dohrer | |
| 5,282,347 A | 2/1994 | Cleine et al. | |
| 5,308,690 A * | 5/1994 | Butcher, Jr. | B32B 27/08 428/140 |
| 5,741,387 A | 4/1998 | Coleman | |
| 5,814,399 A | 9/1998 | Eichbauer | |
| 5,888,615 A | 3/1999 | Mascarenhas et al. | |
| 5,916,692 A | 6/1999 | Brambilla | |
| 5,935,681 A | 8/1999 | Paulett | |
| 5,948,493 A | 9/1999 | Groeger | |
| 5,976,682 A | 11/1999 | Eichbauer | |
| 5,998,017 A | 12/1999 | Eichbauer | |
| 6,132,827 A | 10/2000 | Miro | |
| 6,171,681 B1 | 1/2001 | Mascarenhas et al. | |
| 6,265,055 B1 | 7/2001 | Simpson et al. | |
| 6,420,022 B2 | 7/2002 | Bonke et al. | |
| 6,492,010 B1 | 12/2002 | Karaoglu et al. | |
| 6,602,598 B1 | 8/2003 | Simpson et al. | |

| | | | |
|---|---|---|---|
| RE38,429 E | 2/2004 | Eichbauer | |
| 6,692,805 B2 | 2/2004 | Bonke | |
| 6,767,601 B2 | 7/2004 | Colombo | |
| 6,774,062 B1 | 8/2004 | Bryniarski | |
| 6,777,046 B1 | 8/2004 | Tatarka et al. | |
| 6,942,909 B2 * | 9/2005 | Shirrell | B32B 27/306 428/218 |
| 7,080,734 B1 * | 7/2006 | Morris | B65D 85/04 206/400 |
| 8,080,304 B2 * | 12/2011 | Clarke | B32B 3/266 428/137 |
| 2001/0014401 A1 | 8/2001 | Bonke et al. | |
| 2002/0007607 A1 | 1/2002 | Matlack et al. | |
| 2002/0037386 A1 | 3/2002 | Bonke | |
| 2002/0050124 A1 | 5/2002 | Jaeger | |
| 2003/0151159 A1 | 8/2003 | Santisteban et al. | |
| 2004/0033741 A1 | 2/2004 | Peng | |
| 2004/0084803 A1 | 5/2004 | Bonke | |
| 2004/0097157 A1 | 5/2004 | Cosentino | |
| 2004/0121108 A1 | 6/2004 | Mass et al. | |
| 2004/0127119 A1 | 7/2004 | Brighton et al. | |
| 2005/0096613 A1 | 5/2005 | Carper et al. | |
| 2005/0118391 A1 | 6/2005 | Kavvadias et al. | |
| 2005/0123721 A1 | 6/2005 | Heikaus et al. | |
| 2005/0124240 A1 | 6/2005 | Porter | |
| 2005/0158567 A1 | 7/2005 | Carper et al. | |
| 2007/0178284 A1 | 8/2007 | Barry | |
| 2008/0311365 A1 * | 12/2008 | Tukachinsky | B32B 27/08 428/220 |
| 2010/0000895 A1 * | 1/2010 | Weissbrod | B65B 25/24 53/409 |
| 2010/0129632 A1 * | 5/2010 | Eichbauer | B32B 27/327 428/220 |

FOREIGN PATENT DOCUMENTS

| | | | |
|---|---|---|---|
| GB | 2348633 A | 10/2000 | |
| WO | 9117944 A1 | 11/1991 | |
| WO | 9629203 A2 | 9/1996 | |
| WO | 0061359 A2 | 10/2000 | |
| WO | 2017039524 A1 | 3/2017 | |

OTHER PUBLICATIONS

Plastic Wrap Wikipedia Search, pp. 1-3, Dated Apr. 27, 2009.
International Search Report and Written Opinion regarding International Application No. PCT/IB2021/059781, dated Jan. 5, 2022 (10 Pages).
Canadian Search Report for Canadian Application No. 3,135,395, Dated Jan. 4, 2023 (4 pages).

* cited by examiner

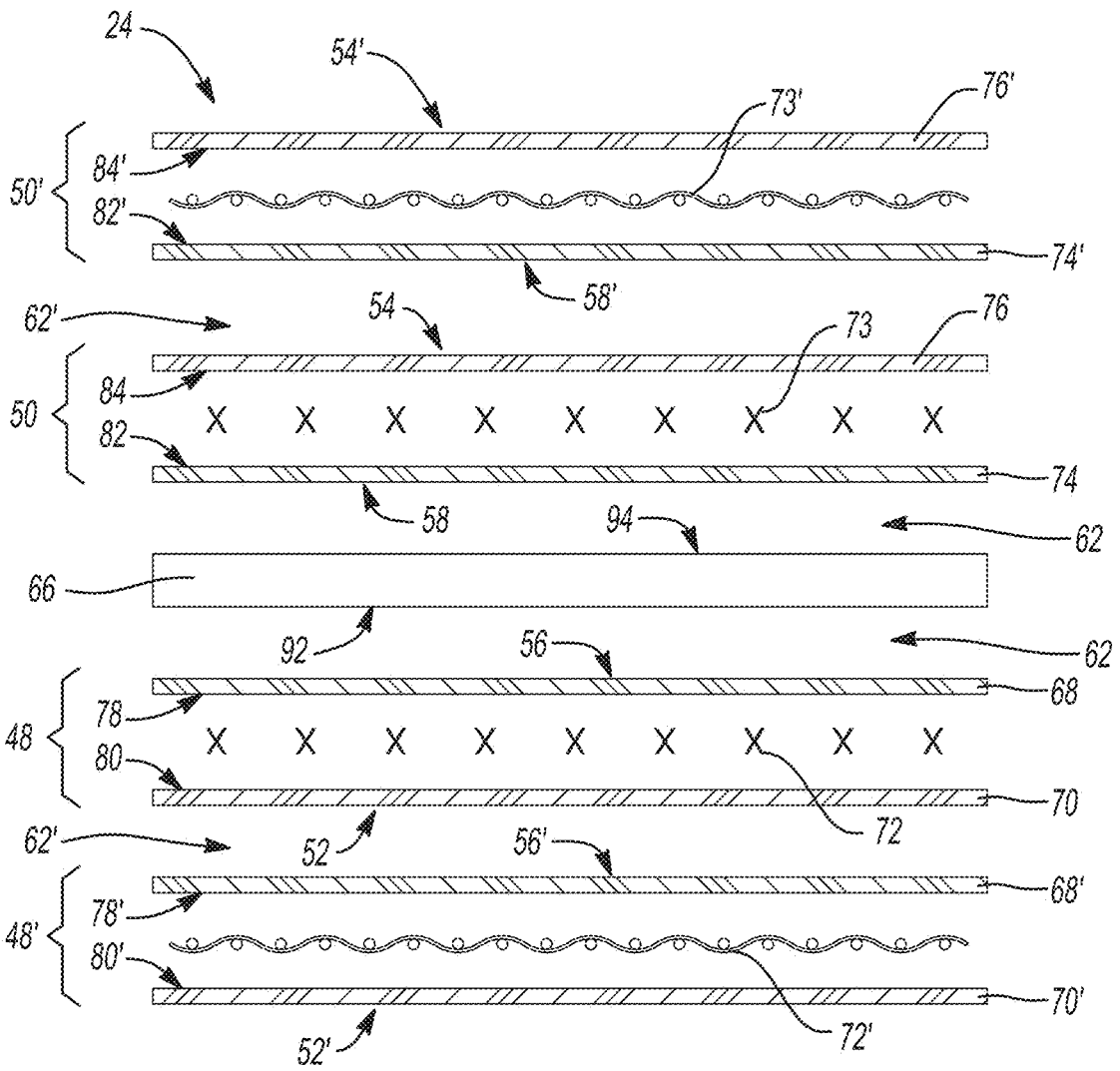
<u>Fig - 5C</u>

MULTI-LAYER PACKAGING PAD

CROSS-REFERENCE TO RELATED APPLICATIONS

This application is a divisional of U.S. patent application Ser. No. 17/506,779, filed Oct. 21, 2021, which claims the benefit of U.S. Provisional Application No. 63/104,766, filed on Oct. 23, 2020. The entire disclosures of the above applications are incorporated herein by reference.

FIELD

The subject disclosure is generally directed to multi-layer packaging pads and more particularly to multi-layer packaging pads that are designed to be applied to a wrapped metal coil or other wrapped products to provide additional reinforcement to the packaging wrap at high wear locations. The subject disclosure is also directed to methods of manufacturing and using the multi-layer packaging pads described herein as part of a packaging system for protecting an object, such as a metal coil.

BACKGROUND

This section provides background information related to the present disclosure which is not necessarily prior art.

The metal industry produces large rolls of sheet metal material (e.g., steel or aluminum coils), which are used as feedstock in various manufacturing sectors. For example, metal coils are used as feedstock material in the automotive industry for vehicle body panels and other stamped parts. As another example, metal coils are used as feedstock material to make consumer appliances, such as refrigerators, ovens, dishwashers, washing machines, and dryers.

The metal coils themselves may be 5 to 8 feet in diameter, can weigh 20,000 to 40,000 pounds, and have a value of around $5,000 to $10,000 per coil. Once the sheet metal is rolled up into a coil, it is secured using eye ties, belly bands, or similar strapping to prevent the coil from unraveling. The coil is also wrapped with a wrap material, either by hand or by an automated coil wrap process. There are a number of machines in the marketplace that perform an automated coil wrap process. Examples include the CoilMaster® machine made by Signode Industrial Group LLC of Glenview, Illinois, the MEC DAGI® machine made by VCI Brasil of Bauru, Brazil, and the COIL SEAL machine made by Chadwick Engineering Ltd. of Kingston, Ontario. All of these machines wrap/wind a sheet or sheets of wrap material (s) around the metal coil in a partially overlapping arrangement and make multiple passes until the entire coil is wrapped in the wrap material(s).

Wrap material is typically supplied in rolls, which can be loaded directly into and dispensed from coil wrap machines. Exemplary wrap materials include, without limitation, paper, woven polyester sheeting, and plastic wrap. Plastic wrap materials include both reinforced and non-reinforced stretch film, such as polyethylene film. As an example, the applicant makes reinforced wrap materials, which are sold under the Panacea Wrap® tradename. On Dec. 20, 2011, the applicant was awarded U.S. Pat. No. 8,080,304 entitled "Multi-layer wrap," which is directed to the Panacea Wrap® products and is expressly incorporated herein by reference.

Metal coils are susceptible to various environmental conditions, including corrosion/rust when exposed to moisture. The wrap material helps protect the metal coil from moisture and abrasion when the coil is in storage, handled, or in transit via rail car, ship, or flatbed truck. Metal coils must survive a rough and tough environment from the time they are produced until they reach an end customer. Given their size and weight, metal coils are often picked up and handled by large cranes or other lifting equipment and are secured during transportation by chains. The packaging of metal coils is therefore important because metal coils damaged by corrosion are often scrapped, which can result in significant losses given the monetary value of metal coils.

In addition to wrapping metal coils, such wrap materials may be used to package other objects, including without limitation, other types of feedstock materials, bundles or rolls of metal wire, building materials, and consumer goods. As such, it should be understood that the multi-layer packaging pads described herein may find utility in a wide variety of different packaging applications, including without limitation, packaging systems for metal coils.

SUMMARY

This section provides a general summary of the disclosure and is not a comprehensive disclosure of its full scope or all of its features.

In accordance with one aspect of the present disclosure, an improved packaging system is provided. The packaging system comprises a wrap material that is designed to be wound or wrapped about an object, such as a metal coil. The packaging system includes one or more multi-layer packaging pads that are applied to the wrap materials at high wear locations to provide increased abrasion resistance at those locations. The multi-layer packaging pad includes at least a first ply and a second ply. The first ply includes an inner pad surface and a first inside slip surface opposite the inner pad surface. The second ply includes an outer pad surface and a second inside slip surface opposite the outer pad surface. The first and second plies are disposed in an overlapping arrangement with the first and second inside slip surfaces facing one another. The first and second plies are connected along only a sealed perimeter of the multi-layer packaging pad to provide a slip region between the first and second plies. The first and second inside slip surfaces are formulated to slide relative to one another such that an unconstrained middle portion of the second ply is moveable relative to the first ply. The inner pad surface of the first ply is an outside surface of the multi-layer packaging pad and includes cling properties or an adhesive, which allows the inner pad surface of the first ply to stick to the wrap material after the wrap material has been applied to (i.e., wrapped around) the metal coil or other object being packaged. Because the inner pad surface engages the wrap material, the first ply remains stationary relative to the wrap material while the unconstrained middle portion of the second ply is moveable relative to the first ply and thus the wrap material to at least some degree. The ability of the multi-layer packaging pad to permit movement of the unconstrained middle portion of the second ply relative to the stationary first ply significantly improves abrasion resistance because the relatively loose unconstrained middle portion of the second ply can move with an external object to some degree, such as the jaws of a crane or other handling equipment, reducing the likelihood of wear and/or puncture.

In accordance with another aspect of the present disclosure, the first and second plies are each made of a multi-layer film laminate comprising multiple sheets of reinforced material where each sheet contains reinforcing ribs. The sheets of reinforced material are disposed in an overlapping or partially overlapping arrangement at different angular orientations such that the reinforcing ribs of one sheet extend in different directions relative to the reinforcing ribs of an adjacent sheet to provide multi-axial rib overlap across each of the first and second plies. Because the reinforcing ribs of adjacent sheets lay across one another at two or more orientations, a rib web is created that resists punctures. If a puncture does occur, it will be contained within the very small space between the crisscrossing reinforcing ribs of the multiple sheets in each ply.

In accordance with another aspect of the present disclosure, a method is provided for applying the multi-layer packaging pad described above to a metal coil or other object being packaged. The method includes sticking the inner pad surface of the first ply against the wrap material on a pre-wrapped metal coil or other pre-wrapped object. As explained above, the multi-layer packaging pad can be applied at a high wear location. For example, typical coil handling cranes have jaws that close on opposing ends of a metal coil from above until portions of the jaws enter the eye (i.e., the center bore-like opening) of the metal coil. Sometimes the jaws cut, tear, puncture, or otherwise weaken the wrap material where the jaws engage/grab the metal coil. As a result, the multi-layer packaging pads disclosed herein may be placed on the opposing ends of a pre-wrapped metal coil to cover locations above the eye of the coil (e.g., the twelve o'clock position) to protect the wrap material from damage by a crane or other lifting equipment. Notwithstanding this example, the multi-layer packaging pads disclosed herein may be placed over any high wear location where the wrap material has failed or may be prone to failing. In this way, the multi-layer packaging pads disclosed herein may be used to cover and/or repair holes, tears, abrasion, or other damage present in the wrap material covering the pre-wrapped object.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 5C is a side cross-sectional view of another exemplary multi-layer packaging pad that is constructed according to the present disclosure;

DETAILED DESCRIPTION

Figure 1:
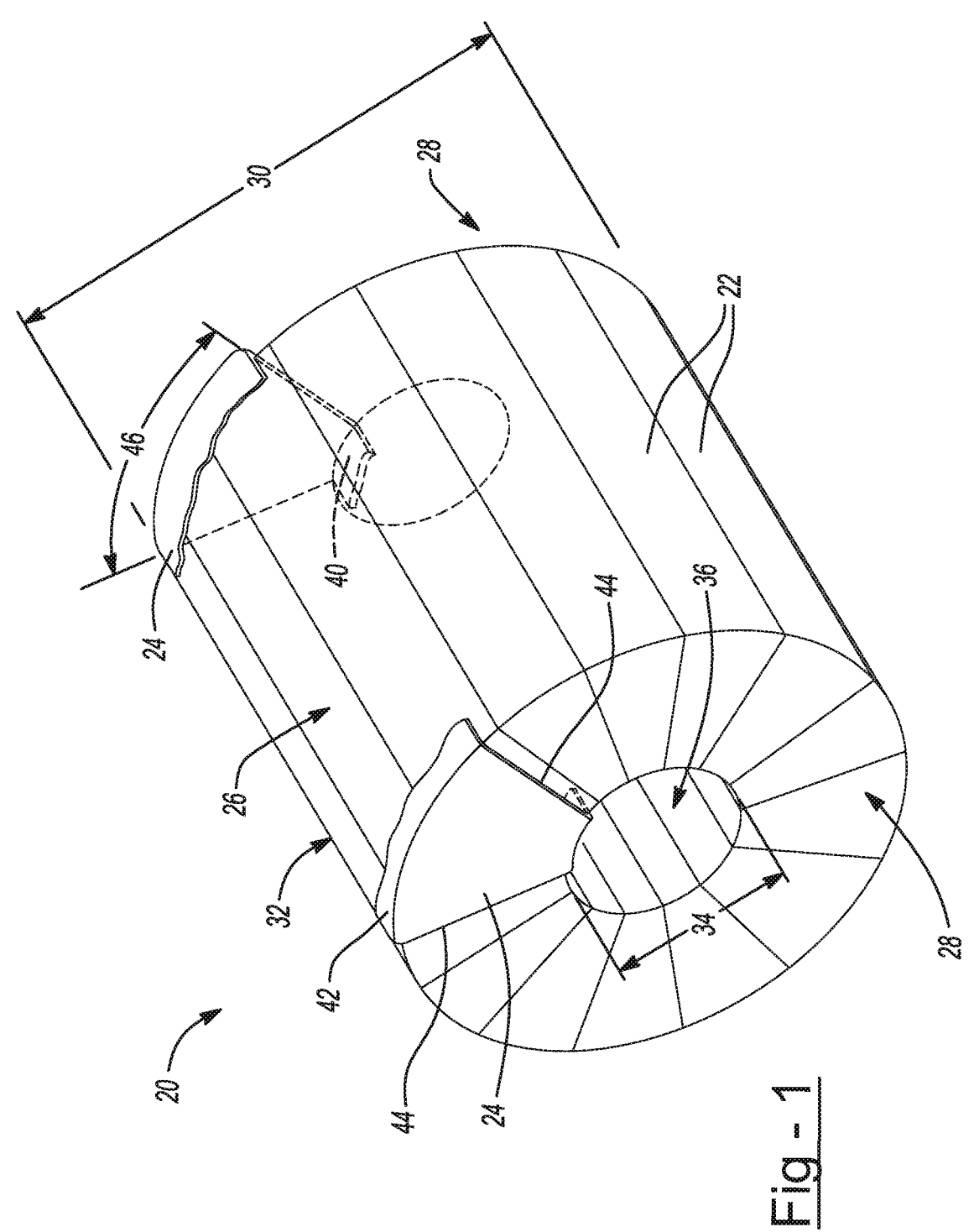
FIG. 1 is a front perspective view of a metal coil that has been packaged using a packaging system comprising an exemplary wrap material and exemplary multi-layer packaging pads, which are constructed according to the present disclosure.

Referring to the Figures, wherein like numerals indicate corresponding parts throughout the several views, a packaging system 20 including wrap material 22 and one or more multi-layer packaging pads 24 are illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates a packaging system 20 for protecting an object, such as a metal coil 26. As an example, the metal coil 26 may be formed as a single, continuous piece of sheet metal that is rolled up to create a tightly wound cylinder, which includes a pair of opposing ends 28, an outer diameter 30 defined by an outer cylindrical surface 32, and an inner diameter 34 defined by an eye 36 that extends axially through the center of the metal coil 26 like a bore that is open at each opposing end 28. The metal coil 26 may be made from any one of a wide variety of metals, but it should be noted that steel coils and aluminum coils are among the most widely produced.

The packaging system 20 shown in FIG. 1 includes a wrap material 22 covering the metal coil 26 and two multi-layer packaging pads 24 that are applied over the wrap material 22 at locations above the eye 36 on each of the opposing ends 28 of the metal coil 26. This particular arrangement places the multi-layer packaging pads 24 at high wear locations on the metal coil 26, which may coincide with the portions of the wrapped metal coil 26 that come into contact with the jaws of overhead cranes (not shown), which are used in mills and other facilities to lift and move metal coils 26. However, it should be appreciated that the multi-layer packaging pads 24 disclosed herein may be applied at other locations on the metal coil 26 than those shown in FIG. 1. For reasons which will be explained in greater detail below, the multi-layer packaging pads 24 provide improved abrasion resistance and puncture resistance over the level of protection provided by the wrap material 22 alone.

As shown in FIG. 1, the wrap material 22 is a relatively narrow (approximately 9.5 inches wide) film that runs axially over the outer cylindrical surface 32 of the metal coil 26, radially across a portion of one end 28 of the metal coil 26, axially through the eye 36, and then radially across a portion of the other end 28 of the metal coil 26 in a repeating loop-like arrangement where adjacent loops or runs overlap by approximately 1-2 inches so that the entire metal coil 26 is covered by the wrap material 22. In this way, the wrap material 22 seals the metal coil 26 to protect it. As noted above, the wrap material 22 may be applied to the metal coil 26 in this arrangement using an automated coil wrap machine (not shown), such as the CoilMaster® machine made by Signode Industrial Group LLC of Glenview, Illinois or the MEC DAGI® machine made by VCI Brasil of Bauru, Brazil.

The wrap material 22 may be supplied in rolls that are 1,200 feet long or more and can be loaded directly into and dispensed from a shuttle (not shown) of the coil wrap machine. Exemplary wrap materials 22 include, without limitation, paper, woven polyester sheeting, and plastic wrap. Plastic wrap materials include both reinforced and non-reinforced stretch film, such as low density polyethylene (LDPE) film, linear low density polyethylene (LLDPE) film, and high density polyethylene (HDPE) film. As an example, the applicant makes reinforced wrap materials, which are sold under the Panacea Wrap® tradename.

Figure 2A:
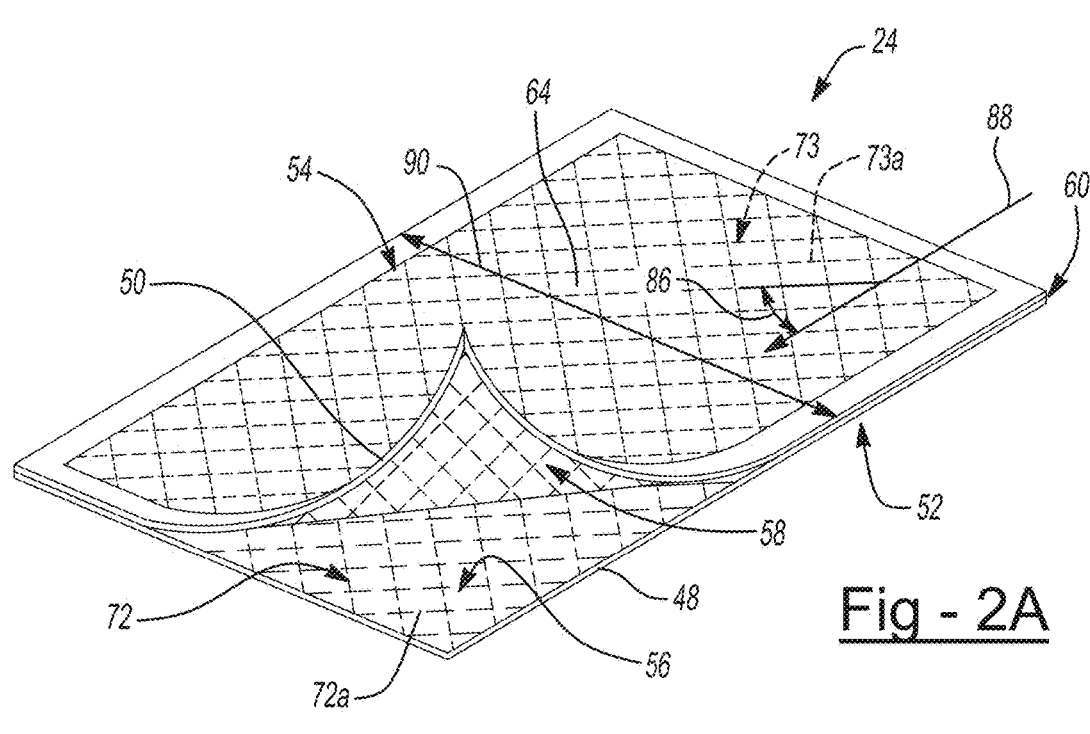
FIG. 2A is a top perspective view of an exemplary multi-layer packaging pad that is constructed according to the present disclosure.
Figure 2B:
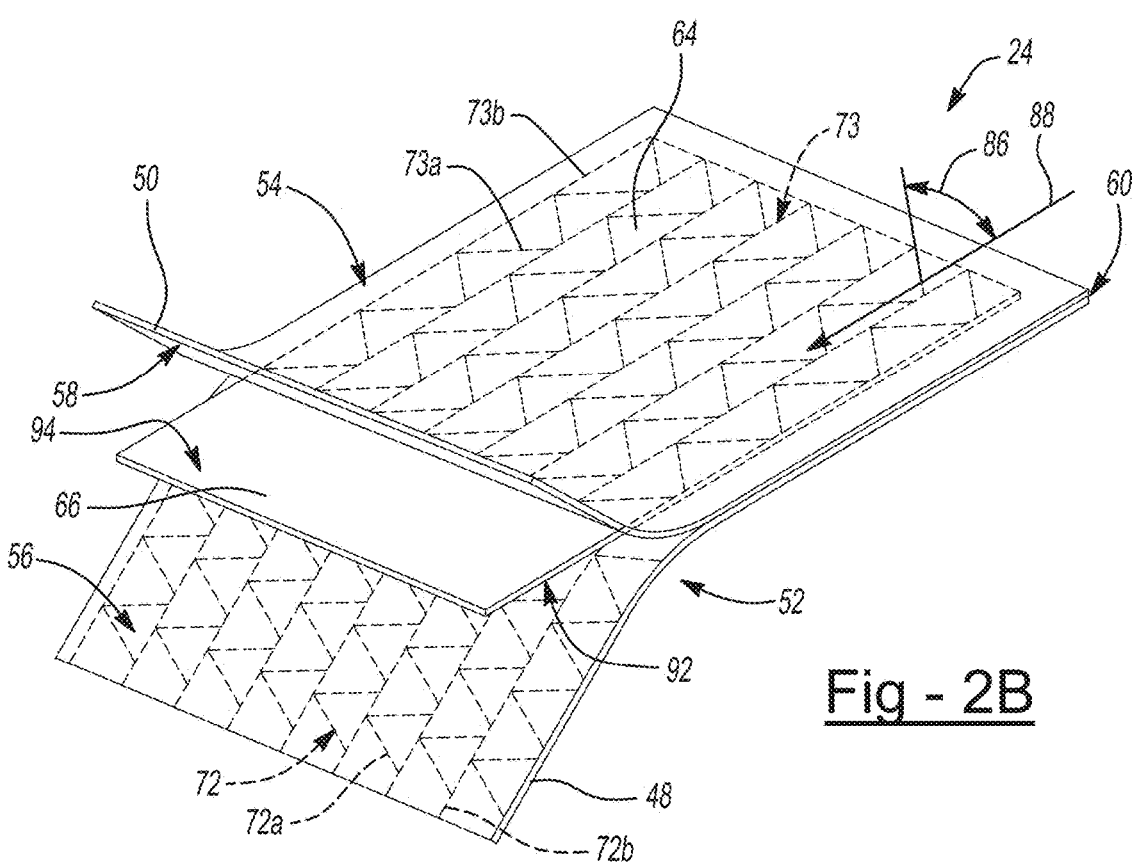
FIG. 2B is a top perspective view of another exemplary multi-layer packaging pad that is constructed according to the present disclosure.
Figure 2C:
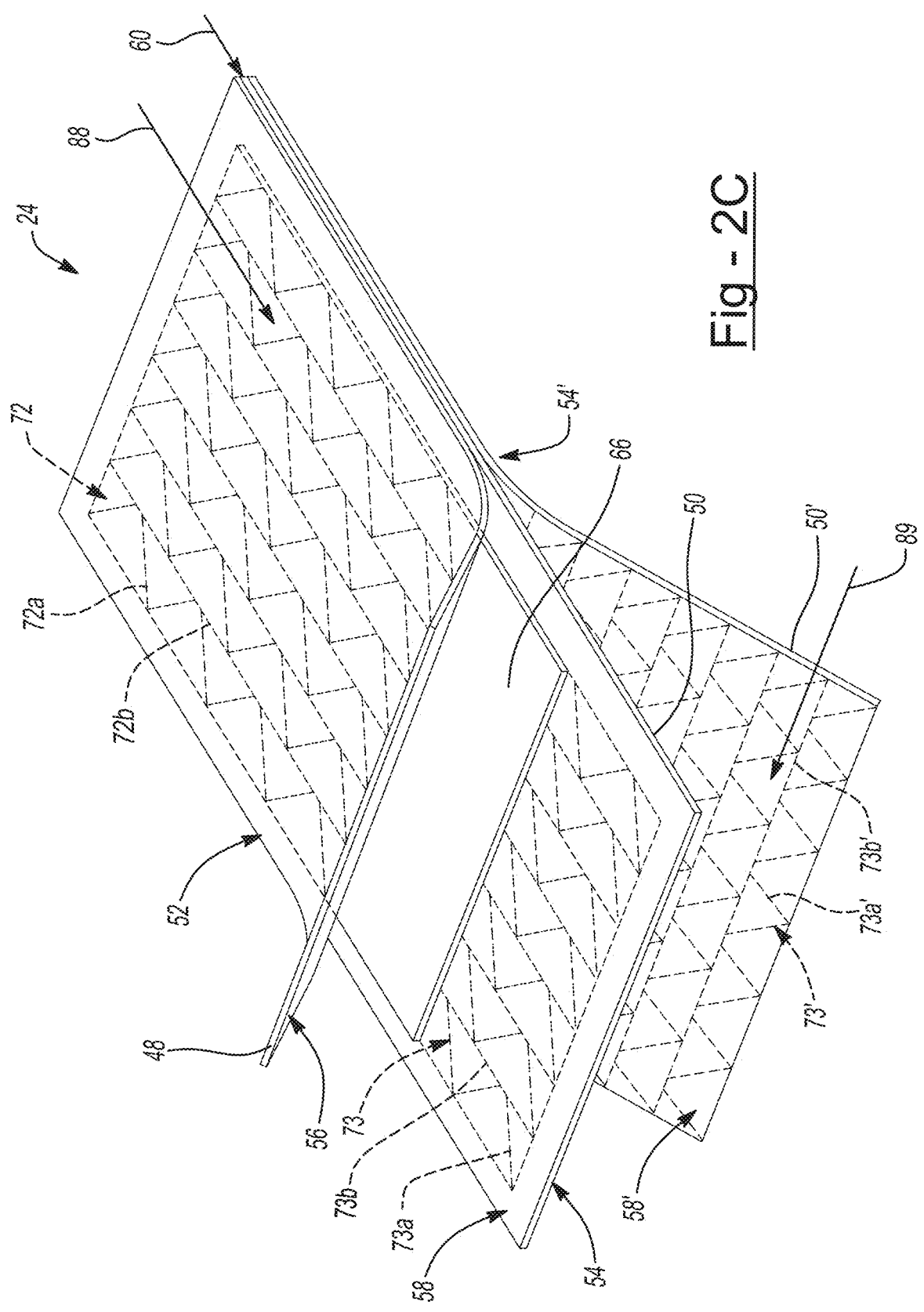
FIG. 2C is a bottom perspective view of another exemplary multi-layer packaging pad that is constructed according to the present disclosure.
Figures 2D, 3A:
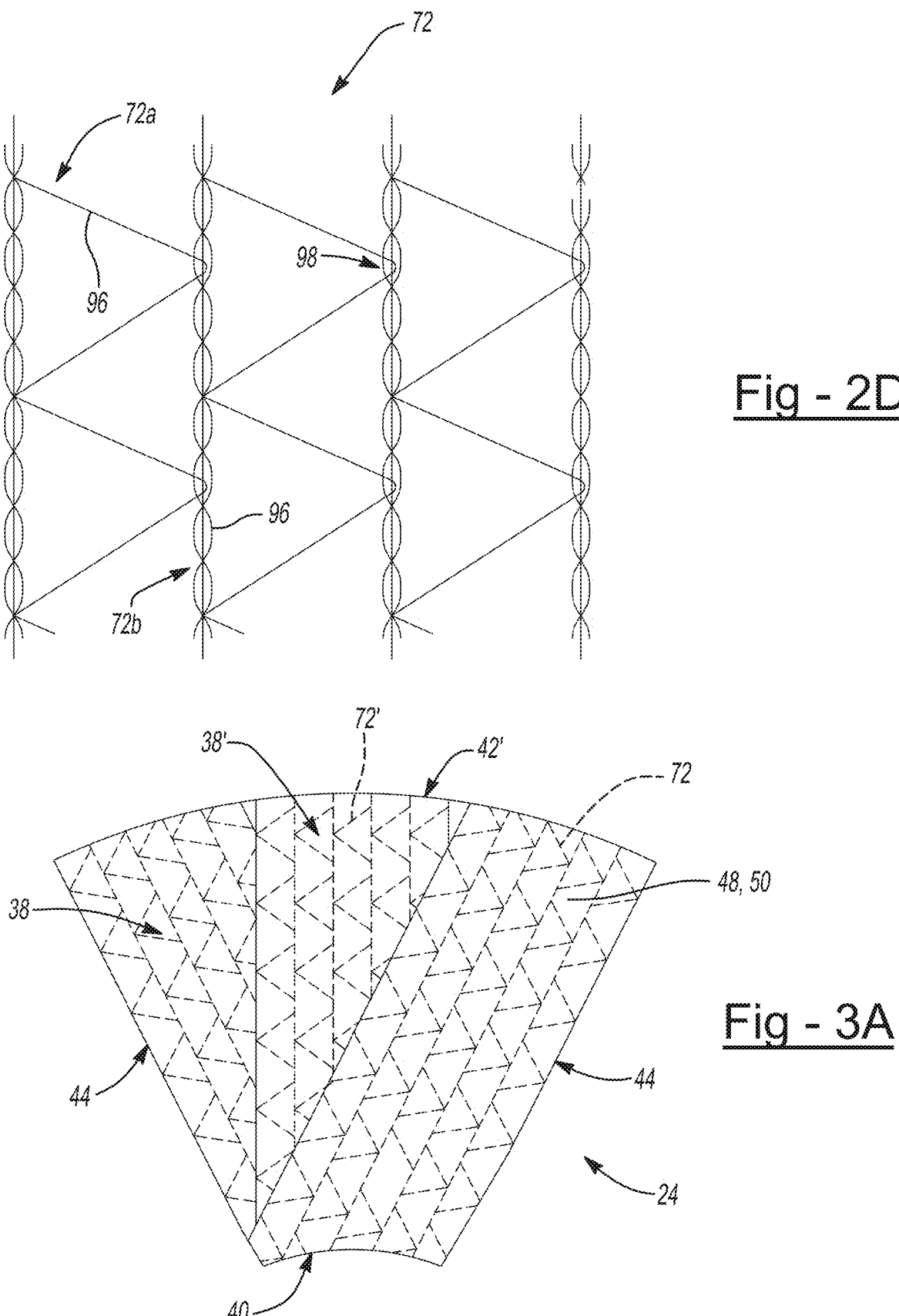
FIG. 2D is an enlarged top elevation view of a reinforcing rib layer of the exemplary multi-layer packaging pad shown in FIGS. 2B and 2C.
FIG. 3A is a top elevation view of another exemplary multi-layer packaging pad that is constructed according to the present disclosure where the multi-layer packaging pad is shaped as an annulus sector.

In FIGS. 1 and 3A, the multi-layer packaging pads 24 are shaped like an annulus sector (i.e., a wedge-like shape) and include sheets of reinforced material 38, 38' that are arranged at different angular orientations. The multi-layer packaging pads 24 have an inner edge 40 that is tucked into the eye 36 of the metal coil 26 with an overhang of 1-2 inches, an outer edge 42 that is folded over the outer cylindrical surface 32 of the metal coil 26 with an overhang of 1-2 inches, and side edges 44 that run along the ends 28 of the metal coil 26 at the 10 o'clock to 2 o'clock or 11 o'clock to 1 o'clock positions. However, it should be appreciated that the inner and outer edges 40, 42 of the multi-layer packaging pads 24 may have arc-lengths 46 that are larger or smaller than that shown in FIGS. 1 and 3A. For example, the multi-layer packaging pads 24 may be shaped like an annulus (i.e., a circle/flat ring with a circular opening at its center). In such an arrangement, the multi-layer packaging pads 24 would completely cover the opposing ends 28 of the metal coil 26. The multi-layer packaging pads 24 may be configured in a wide variety of other shapes as well. For example, as shown in FIGS. 2A-2C, the multi-layer packaging pads 24 may be shaped like a rectangle.

Figures 3B, 3C:
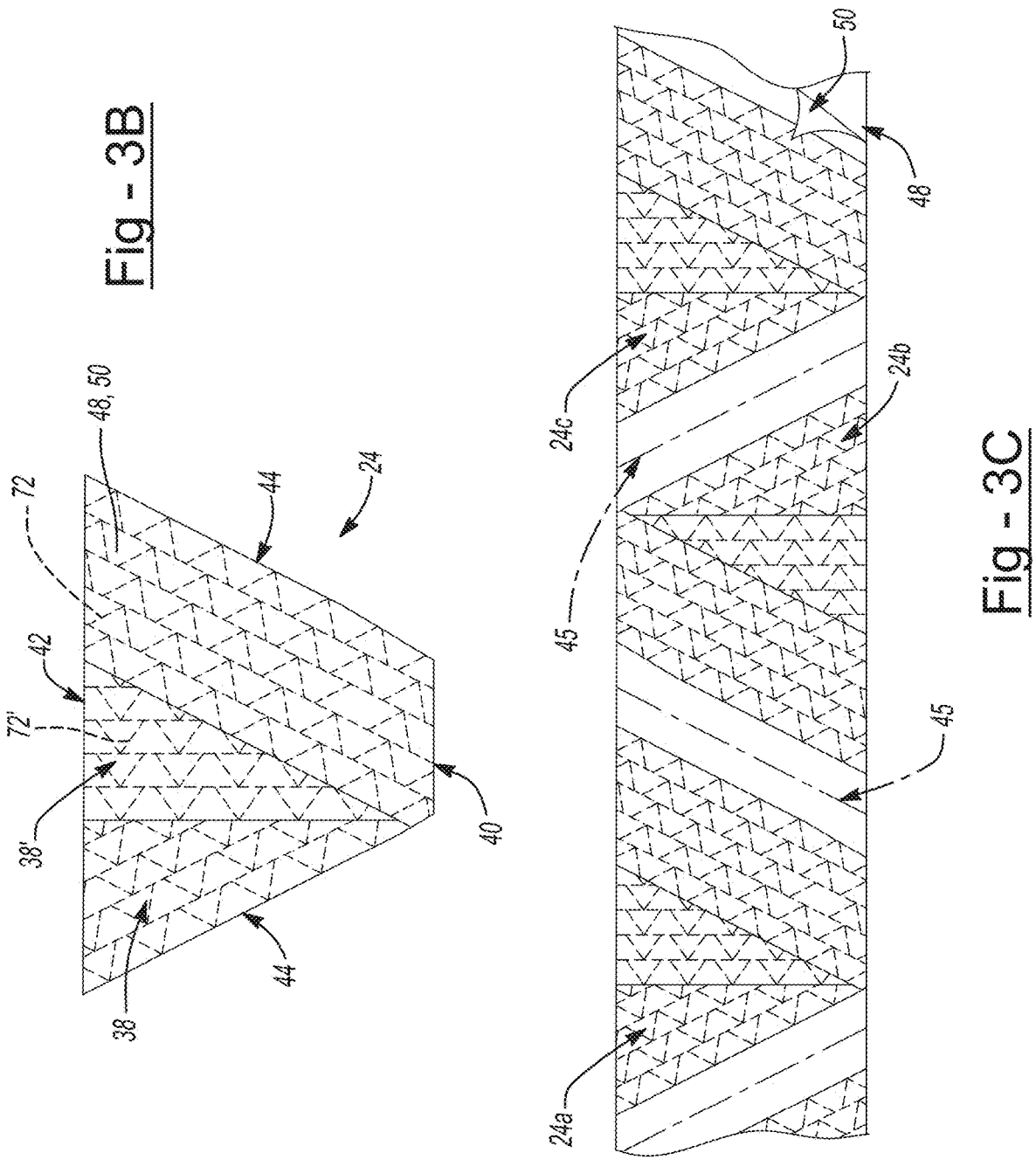
FIG. 3B is a top elevation view of another exemplary multi-layer packaging pad that is constructed according to the present disclosure where the multi-layer packaging pad is shaped as a trapezoid.
FIG. 3C is top elevation view illustrating an exemplary manufacturing process for making the multi-layer packaging pad shown in FIG. 3B.
Figure 4:
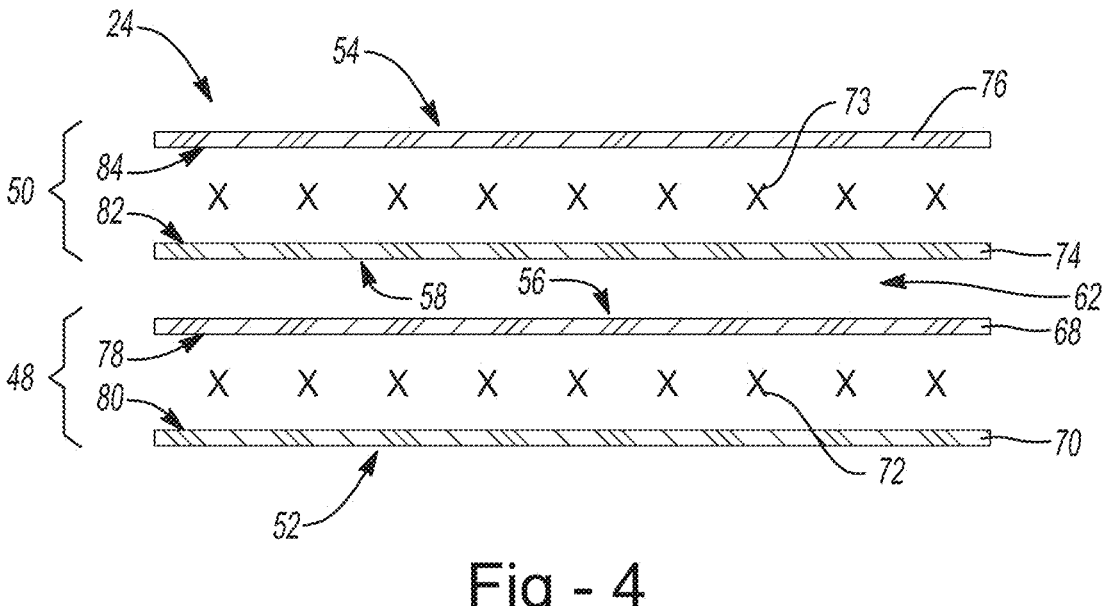
FIG. 4 is a side cross-sectional view of the exemplary multi-layer packaging pad shown in FIG. 2A.

In FIG. 3B, the inner and outer edges 40, 42 of the multi-layer packaging pad 24 are substantially straight and give the multi-layer packaging pad 24 a trapezoid shape. Again, the multi-layer packaging pad 24 has sheets of reinforced material 38, 38' that are arranged at different angular orientations. FIG. 3C illustrates an exemplary process for manufacturing the multi-layer packaging pad 24 shown in FIG. 3B. Specifically, the sheets of reinforced material 38, 38' may be cross-laminated to form opposing plies 48, 50, which are arranged in an overlapping relationship. The opposing plies 48, 50 may be provided as two overlapping strips of material, as a flat tube of material where the opposing plies 48, 50 form opposite sides (i.e., side walls) of the flat tube, or as two rolls of material that are unwound and brought together one on top of the other. Alternatively, the opposing plies 48, 50 may be rolled together as a single roll of material. The opposing plies 48, 50 are then heat-sealed and die-cut along diagonal lines 45 to create multiple trapezoidal multi-layer packaging pads 24a, 24b, 24c as part of a continuously running manufacturing line operation.

It should be appreciated that each multi-layer packaging pad 24 includes at least a first ply 48 and a second ply 50, regardless of the overall shape of the multi-layer packaging pad 24. The first and second plies 48, 50 are both made from flexible sheets of material (i.e., the first and second plies 48, 50 are not rigid) such that the multi-layer packaging pad 24 will conform to the shape of any surface of the wrapped metal coil 26 to which it is applied. As shown in FIGS. 2A-2C, the first ply 48 has an inner pad surface 52, which is an outside surface of the multi-layer packaging pad 24 that is formulated to engage and stick to the wrap material 22 such that the first ply 48 remains stationary relative to the wrap material 22. The inner pad surface 52 may have cling properties or an adhesive, such as a pressure sensitive adhesive, water activated adhesive, ultra-violet light activated adhesive, or heat activated adhesive, which could be applied by a coating process or as a roll of adhesive material that is laminated to the inner pad surface 52. In addition, a peel layer or backing layer may be applied to the inner pad surface 52 that is designed to be removed prior to application of the multi-layer packaging pad 24 to the wrap material 22. Preferably, the inner pad surface 52 and the wrap material 22 are formulated to provide a peel force of at least 10 gmf/25 mm, which may be measured by a 180 degree unsupported peel (T-Peel) (ASTM D1876) test. In embodiments where cling properties of the inner pad surface 52 are utilized to hold the multi-layer packaging pad 24 to the wrap material 22, the inner pad surface 52 may be provided by a single layer or multi-layer cast or blow polyethylene stretch film. In addition, one or more cling additives, such as polyisobutylene (PIB), may be utilized to provide a desired level of cling engagement between the inner pad surface 52 of the first ply 48 and the wrap material 22.

The second ply 50 has an outer pad surface 54, which forms the other outside surface of the multi-layer packaging pad 24 in FIGS. 2A-2C. The outer pad surface 54 of the second ply 50 faces away from the metal coil 26 when the multi-layer packaging pad 24 is applied to the wrap material 22 and is therefore the surface of the multi-layer packaging pad 24 that comes into contact with any equipment used to pick-up and move the metal coil 26, such as a crane. As will be explained below, the outer pad surface 54 of the second ply 50 may optionally be formulated as a slip surface to reduce friction and the tackiness of the surface of the multi-layer packaging pad 24 that contacts the crane. The first ply 48 has a first inside slip surface 56 opposite the inner pad surface 52 and the second ply 50 has a second inside slip surface 58 opposite the outer pad surface 54. The first and second plies 48, 50 are disposed in an overlapping arrangement with the first and second inside slip surfaces 56, 58 facing one another. The first and second plies 48, 50 are connected along only a sealed perimeter 60 of the multi-layer packaging pad 24 to provide a slip region 62 (as shown in FIGS. 4 and 5A-5C) between the first and second plies 48, 50 where an unconstrained middle portion 64 of the second ply 50 is moveable relative to the first ply 48. It should be understood that that term "unconstrained," as used throughout, means the unconstrained portion of the ply is not bonded to adjacent layers in slip region(s) 62.

The first and second plies 48, 50 may be made of a range of different materials. For example, the first and second plies 48, 50 may each be an unreinforced single film, an unreinforced multi-layer film laminate, a reinforced multi-layer film laminate, or a cross-direction reinforced multi-layer film laminate. Additionally, it should be appreciated that various combinations are possible where both the first and second plies 48, 50 are multi-layer film laminates or single films or where only one of the plies 48, 50 is a multi-layer film laminate.

FIGS. 4 and 5A-5C illustrate exemplary configurations where the first and second plies 48, 50 are both multi-layer film laminates. In these configurations, the first ply 48 includes a first inside film 68, a first outside film 70, and a first plurality of reinforcing ribs 72, which are disposed between the first inside film 68 and the first outside film 70. Similarly, the second ply 50 includes a second inside film 74, a second outside film 76, and a second plurality of reinforcing ribs 73, which are disposed between the second inside film 74 and the second outside film 76. The first and second inside films 68, 74 and the first and second outside films 70, 76 may be any combination of single layer films or multi-layer films, including, for example, polypropylene film and blown, extruded, or cast polyethylene film, such as low density polyethylene (LDPE) film, linear low density polyethylene (LLDPE) film, or high density polyethylene (HDPE) film. It should be appreciated that any one of the first and second inside films 68, 74 and the first and second outside films 70, 76 may have multiple layers that are cast, extruded, or otherwise created during the film manufacturing process, or alternatively may be multi-layer laminates that are created by laminating multiple films together to create any one of the first and second inside films 68, 74 and the first and second outside films 70, 76. It should also be appreciated that various thicknesses of film(s) can be used, including without limitation, films having thicknesses of 0.0038 millimeters (i.e., 15 gauge film) and up.

Still referring to FIGS. 4 and 5A-5C, the first inside slip surface 56 of the first ply 48 is defined by the first inside film 68 while the inner pad surface 52 of the first ply 48 is defined by the first outside film 70. The first inside film 68 includes a first inside film cling surface 78 opposite the first inside slip surface 56 and the first outside film 70 includes a first outside film cling surface 80 opposite the inner pad surface 52. The first inside film cling surface 78 is arranged in cling engagement with the first outside film cling surface 80 through spaces between the first plurality of reinforcing ribs 72. The second inside slip surface 58 of the second ply 50 is defined by the second inside film 74 while the outer pad surface 54 of the second ply 50 is defined by the second outside film 76. The second inside film 74 includes a second inside film cling surface 82 opposite the second inside slip surface 58 and the second outside film 76 includes a second outside film cling surface 84 opposite the outer pad surface 54. The second inside film cling surface 82 is arranged in cling engagement with the second outside film cling surface 84 through spaces between the second plurality of reinforcing ribs 73. Preferably, the cling engagement between the first inside film cling surface 78 and the first outside film cling surface 80 and the cling engagement between the second inside film cling surface 82 and the second outside film cling surface 84 is sufficient to provide a peel force of at least 10 gmf/25 mm between the films, which may be measured by a 180 degree unsupported peel (T-Peel) (ASTM D1876) test.

As shown in FIG. 2A, the reinforcing ribs 72, 73 in the first and second plies 48, 50 may include a plurality of transverse ribs 72a, 73a that intersect and are arranged at oblique angles 86 relative to a longitudinal direction 88 of the sheet of material forming the multi-layer packaging pad 24 such that the reinforcing ribs 72, 73 create a diamond-shaped pattern that extends at least partially across a width 90 of the multi-layer packaging pad 24. In this configuration, also shown in FIG. 4, the first and second inside slip surfaces 56, 58 are arranged in direct contact with one another. As a result, the first and a second inside slip surfaces 56, 58 are formulated to slide relative to one another such that the unconstrained middle portion 64 of the second ply 50 is moveable relative to the first ply 48 and thus the wrap material 22. Although other materials can be used, in the example illustrated in FIGS. 2A, the first and second plies 48, 50 of the multi-layer packaging pad 24 are made of a version of the applicant's Panacea Wrap® Diamond reinforced wrap material that has been modified such that one or both faces of the reinforced material are slip surfaces. For example and without limitation, the multi-layer laminate may be modified to include a high polypropylene blown film, a high density polyethylene (HDPE) blown film, or a slip additive (sometimes referred to as an anti-blocking agent), such as Zinc Stearate, eracamides, talc or silicas, to provide the slip surface(s). Preferably, the first and second slip surfaces 56, 58 do not materially cling to one another, meaning that they exhibit a peel force of less than 5 gmf/25 mm when brought together, which may be measured by a 180 degree unsupported peel (T-Peel) (ASTM D1876) test.

As shown in FIG. 2B, the reinforcing ribs 72, 73 in the first and second plies 48, 50 may alternatively include a combination of transverse ribs 72a, 73a and longitudinal ribs 72b, 73b. The longitudinal ribs 72b, 73b run in the longitudinal direction 88 of the sheet of material forming the multi-layer packaging pad 24 and the transverse ribs 72a, 73a are arranged at oblique angles 86 relative to the longitudinal ribs 72b.

In the configuration shown in FIG. 2C, a third ply 50' may be positioned over and laminated to the outer pad surface 54 of the second ply 50 to provide improved wear and puncture resistance. The third ply 50' includes an external surface 54' that faces away from the second ply 50 and an internal surface 58' that faces the outer pad surface 54 of the second ply 50. In accordance with this embodiment, the outer pad surface 54 of the second ply 50 and the internal surface 58' of the third ply 50' are configured to be laminated together and may be held together by cling forces and/or an adhesive.

The first ply 48 in this embodiment is the same as that described above in connection with FIG. 2B.

In FIG. 2C, the second and third plies 50, 50' are arranged at different angular orientations such that the reinforcing ribs 73, 73' run in different directions relative to each other to provide a multi-axial rib overlap. More specifically, the reinforcing ribs 73' in the third ply 50' may include a combination of transverse ribs 73a' and cross-direction ribs 73b'. The cross-direction ribs 73b' in the third ply 50' have the same construction as the longitudinal ribs 73b in the second ply 50, but run in a cross-direction 89 that is transverse to the longitudinal ribs 73b in the second ply 50. Because the reinforcing ribs 73, 73' in the second and third plies 50, 50' lay across one another at different orientations, a rib web is created that resists punctures. If a puncture does occur, it will be contained within the very small space between the crisscrossing reinforcing ribs 73, 73', preventing punctures or holes in the multi-layer packaging pad 24 from propagating (i.e., getting larger).

FIG. 2D illustrates the reinforcing ribs 72 shown in FIG. 2B as an example; however, it should be appreciated that the reinforcing ribs 73 shown in FIG. 2B and the reinforcing ribs 73' shown in FIG. 2C also have the same construction. Each of the longitudinal ribs 72b comprises a braid of interwoven rib tapes 96 and each of the transverse ribs 72a comprises a single rib tape 96 that passes through the braid of interwoven rib tapes 96 at longitudinally spaced mesh points 98. Each rib tape 96 comprises a flat, narrow strip of material. The cross-direction ribs 73b' shown in FIG. 2C have the same construction as the longitudinal ribs 72b shown in FIG. 2D, but run in a different direction (e.g., cross-direction 89). Similarly, the transverse ribs 73a' shown in FIG. 2C have the same construction as the transverse ribs 72a shown in FIG. 2D, but again, are arranged at a different orientation to create multi-axial rib overlap.

FIGS. 3A-3C illustrate embodiments where each of the first and second plies 48, 50 is a multi-layer film laminate comprising multiple sheets of reinforced material 38, 38' each containing reinforcing ribs 72, 72'. As noted above, the sheets of reinforced material 38, 38' may be, for example, the applicant's Panacea Wrap® or Panacea Wrap® Diamond reinforced wrap material. The sheets of reinforced material 38, 38' are arranged in an overlapping or partially overlapping arrangement such that the multi-layer packaging pad 24 is shaped like an annulus sector. The sheets of reinforced material 38, 38' are arranged at different angular orientations such that the reinforcing ribs 72 of one of the sheets of reinforced material 38 extend in different directions relative to the reinforcing ribs 72' of an adjacent sheet of reinforced material 38' to provide multi-axial rib overlap across each of the first and second plies 48, 50. Because the reinforcing ribs 72, 72' of adjacent sheets 38, 38' lay across one another at various orientations, a rib web is created that resists punctures. If a puncture does occur, it will be contained within the very small space between the crisscrossing reinforcing ribs 72, 72' of the multiple sheets 38, 38' in each ply 48, 50. In other words, the crisscrossing reinforcing ribs 72, 72' prevent punctures or holes in the multi-layer packaging pad 24 from propagating (i.e., getting larger).

In the configurations shown in FIGS. 2B and 2C and FIGS. 5A-5C, a slip sheet 66 is positioned in the slip region 62 between the first and second plies 48, 50. The slip sheet 66 is unconstrained within the slip region 62 and is moveable relative to the first and second plies 48, 50 in the slip region 62. The slip sheet 66 also includes a third slip surface 92 that faces the first inside slip surface 56 of the first ply 48 and a fourth slip surface 94 that faces the second inside slip surface 58 of the second ply 50. The first inside slip surface 56 of the first ply 48 and the third slip surface 92 of the slip sheet 66 are arranged in an opposing relationship with one another and the second inside slip surface 58 of the second ply 50 and the fourth slip surface 94 of the slip sheet 66 are arranged in an opposing relationship with one another. The first inside slip surface 56 of the first ply 48 and the third slip surface 92 of the slip sheet 66 are formulated to slide relative to one another and the second inside slip surface 58 of the second ply 50 and the fourth slip surface 94 of the slip sheet 66 are formulated to slide relative to one another such that at least a middle portion of the slip sheet 66 can slide/slip in a shear movement relative to the first and second plies 48, 50.

Figure 5A:
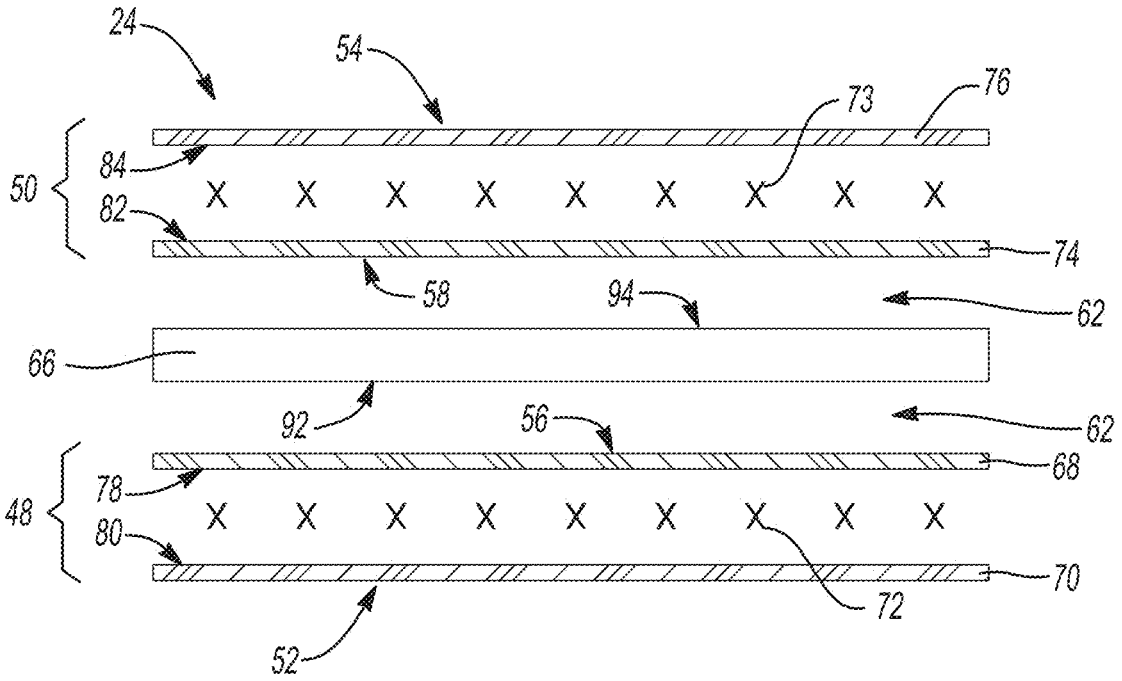
FIG. 5A is a side cross-sectional view of the exemplary multi-layer packaging pad shown in FIG. 2B.
Figure 5B:
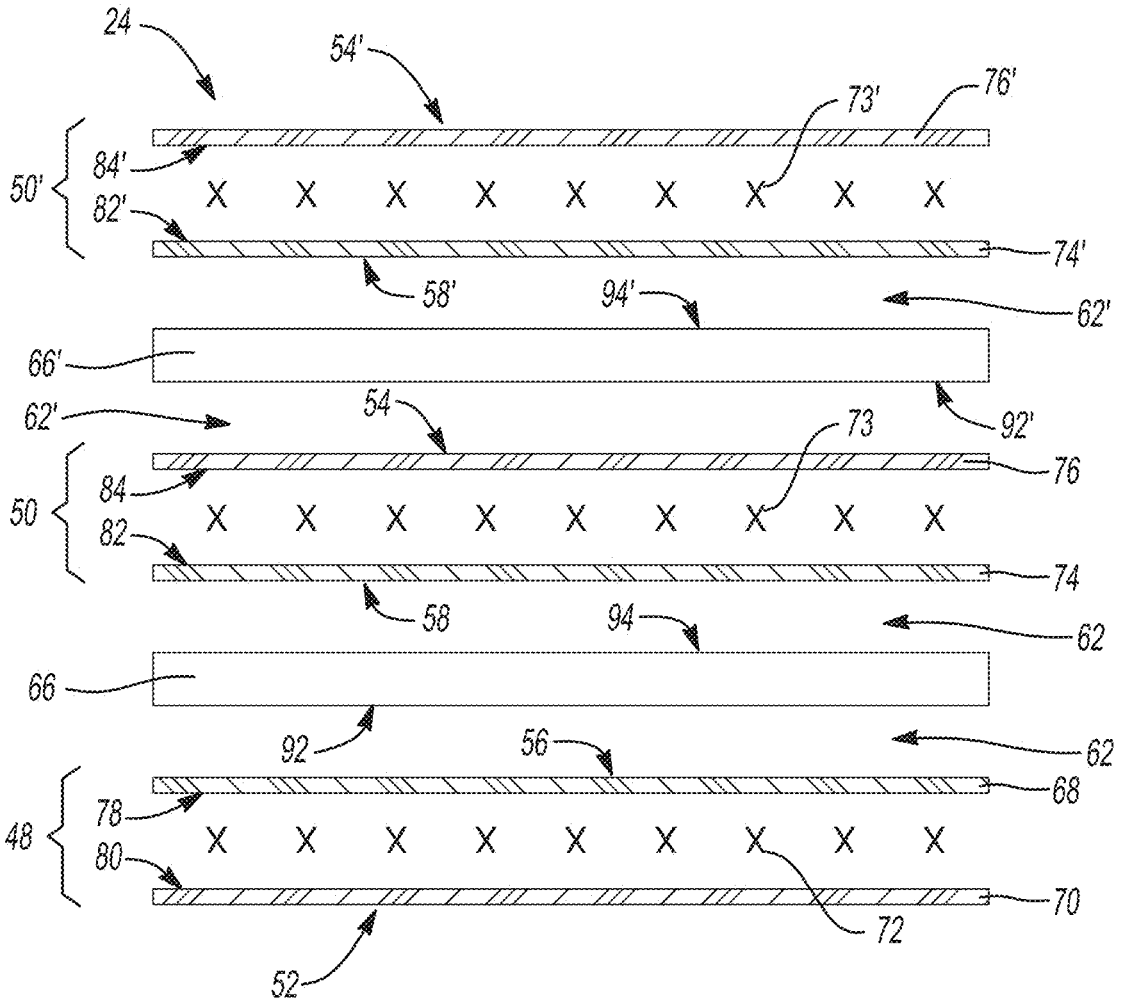
FIG. 5B is a side cross-sectional view of another exemplary multi-layer packaging pad that is constructed according to the present disclosure.

Although other materials can be used, in the example illustrated in FIGS. 2B and 2C and FIGS. 5A-5C, the first and second plies 48, 50 of the multi-layer packaging pad 24 are made of a version of the applicant's Panacea Wrap® material that has been modified such that one or both faces of the wrap material are slip surfaces. For example and without limitation, the multi-layer laminate may be modified to include a high polypropylene blown film, a high density polyethylene (HDPE) blown film, or a slip additive (sometimes referred to as an anti-blocking agent), such as Zinc Stearate, eracamides, talc or silicas, to provide the slip surface(s). The slip sheet 66 may be a single layer film or a multi-layer film laminate that is made out of these same materials to provide the third and fourth slip surfaces 92, 94. Preferably, the first and third slip surfaces 56, 92 and the second and fourth slip surfaces 58, 94 do not materially cling to one another, meaning that they exhibit a peel force of less than 5 gmf/25 mm when brought together, which may be measured by a 180 degree unsupported peel (T-Peel) (ASTM D1876) test. It should be appreciated that the multi-layer packaging pad 24 may have any number of additional plies and/or slip sheets added. For example, FIG. 5B illustrates an alternative arrangement where a third ply 50' and second slip sheet 66' have been added to provide improved wear and puncture resistance. The third ply 50' and second slip sheet 66' are positioned over the outer pad surface 54 of the second ply 50, in an arrangement where the second slip sheet 66' is sandwiched between the second and third plies 50, 50' with slip regions 62' in between. The third ply 50' includes an external surface 54' that faces away from the second ply 50 and the second slip sheet 66' and an internal surface 58' that faces the second slip sheet 66'. More specifically, the third ply 50' may include a third inside film 74', a third outside film 76', and a third plurality of reinforcing ribs 73', which are disposed between the third inside film 74' and the third outside film 76'. The internal surface 58' of the third ply 50' is defined by the third inside film 74' while the external surface 54' of the third ply 50' is defined by the third outside film 76'. The third inside film 74' includes a third inside film cling surface 82' opposite the internal surface 58' and the third outside film 76' includes a third outside film cling surface 84' opposite the external surface 54'. The third inside film cling surface 82' is arranged in cling engagement with the third outside film cling surface 84' through spaces between the third plurality of reinforcing ribs 73'.

In this embodiment, the outer pad surface 54 of the second ply 50 and the internal surface 58' of the third ply 50' are configured as slip surfaces in the same manner as the first and second inside slip surfaces 56, 58 described above. Similarly, the second slip sheet 66' illustrated in FIG. 5B includes fifth and sixth slip surfaces 92', 94' that are configured in the same manner as the third and fourth slip surfaces 92, 94 described above. The fifth slip surface 92' of the second slip sheet 66' faces the outer pad surface 54 of the second ply 50 and is configured to slip easily relative to the outer pad surface 54 of the second ply 50 in the slip region 62'. The sixth slip surface 94' of the second slip sheet 66' faces the internal surface 58' of the third ply 50' and is configured to slip easily relative to the internal surface 58' of the third ply 50' in the slip region 62'. As a result, this arrangement provides additional layers, thickness, padding, and allows for a greater amount of shear movement or travel of the third ply 50' relative to the first ply 48 to prevent tearing. The first ply 48, second ply 50, and slip sheet 66 set forth in this embodiment are otherwise the same as that described above in connection with FIG. 5A. The first ply 48, second ply 50, and third ply 50' are all sealed or laminated together along the sealed perimeter 60 of the multi-layer packaging pad 24, but not in the slip regions 62, 62'. In one configuration, the slip sheets 66, 66' may extend to the sealed perimeter 60 and may be sealed or laminated together with the first ply 48, second ply 50, and/or third ply 50' at only the sealed perimeter 60 of the multi-layer packaging pad 24. In another configuration, the slip sheets 66, 66' may not extend to the sealed perimeter 60 and therefore may not be sealed or laminated together with the first ply 48, second ply 50, and/or third ply 50' at the sealed perimeter 60 of the multi-layer packaging pad 24. In other words, the slip sheets 66, 66' may be loose or "float" inside the slip regions 62, 62' of the multi-layer packaging pad 24.

FIG. 5C illustrates another alternative arrangement of the multi-layer packaging pad 24 where a third ply 50' and a fourth ply 48' have been added to provide improved wear and puncture resistance. The third ply 50' is positioned over and laminated to the outer pad surface 54 of the second ply 50 and the fourth ply 48' is positioned over and laminated to the inner pad surface 52 of the first ply 48 to provide improved wear and puncture resistance.

The third ply 50' includes an external surface 54' that faces away from the second ply 50 and an internal surface 58' that faces the outer pad surface 54 of the second ply 50. In accordance with this embodiment, the outer pad surface 54 of the second ply 50 and the internal surface 58' of the third ply 50' are configured to be laminated together and may be held together by cling forces and/or an adhesive. More specifically, the third ply 50' may include a third inside film 74', a third outside film 76', and a third plurality of reinforcing ribs 73', which are disposed between the third inside film 74' and the third outside film 76'. The internal surface 58' of the third ply 50' is defined by the third inside film 74' while the external surface 54' of the third ply 50' is defined by the third outside film 76'. The third inside film 74' includes a third inside film cling surface 82' opposite the internal surface 58' and the third outside film 76' includes a third outside film cling surface 84' opposite the external surface 54'. The third inside film cling surface 82' is arranged in cling engagement with the third outside film cling surface 84' through spaces between the third plurality of reinforcing ribs 73'.

The fourth ply 48' includes an exterior surface 52' that faces away from the first ply 48 and an interior surface 56' that faces the inner pad surface 52 of the first ply 48. In accordance with this embodiment, the inner pad surface 52 of the first ply 48 and the interior surface 56' of the fourth ply 48' are configured to be laminated together and may be held together by cling forces and/or an adhesive. More specifically, the fourth ply 48' may include a fourth inside film 68', a fourth outside film 70', and a fourth plurality of reinforcing ribs 72', which are disposed between the fourth inside film 68' and the fourth outside film 70'. The interior surface 56' of the fourth ply 48' is defined by the fourth inside film 68' while the exterior surface 52' of the fourth ply 48' is defined by the fourth outside film 70'. The fourth inside film 68' includes a fourth inside film cling surface 78' opposite the interior surface 56' and the fourth outside film 70' includes a fourth outside film cling surface 80' opposite the exterior surface 52'. The fourth inside film cling surface 78' is arranged in cling engagement with the fourth outside film cling surface 80' through spaces between the fourth plurality of reinforcing ribs 72'.

In FIG. 5C, the third and fourth plies 48', 50' are arranged at different angular orientations such that the third plurality of reinforcing ribs 73' and fourth plurality of reinforcing ribs 72' both run in a different direction from the first plurality of reinforcing ribs 72 and the second plurality of reinforcing ribs 73 to provide a multi-axial rib overlap on both sides of the slip sheet 66. Like in FIG. 2C, the third plurality of reinforcing ribs 73' in the third ply 50' may include a combination of transverse ribs 73a' and cross-direction ribs 73b'. The cross-direction ribs 73b' in the third ply 50' have the same construction as the longitudinal ribs 73b in the second ply 50, but run in a cross-direction 89 that is transverse to the longitudinal ribs 73b in the second ply 50. The fourth plurality of reinforcing ribs 72' in the fourth ply 48' have the same construction and orientation as the third plurality of reinforcing ribs 73'. Because the third plurality of reinforcing ribs 73' and fourth plurality of reinforcing ribs 72' both run in a different direction from the first plurality of reinforcing ribs 72 and the second plurality of reinforcing ribs 73, a rib web that resists punctures is created on each side of the slip sheet 66. The first ply 48, second ply 50, and slip sheet 66 set forth in this embodiment are otherwise the same as that described above in connection with FIG. 5A.

The third and fourth inside films 68', 74' and the third and fourth outside films 70', 76' may be any combination of single layer films or multi-layer films, including, for example, polypropylene film and blown, extruded, or cast polyethylene film, such as low density polyethylene (LDPE) film, linear low density polyethylene (LLDPE) film, or high density polyethylene (HDPE) film. It should be appreciated that any one of the third and fourth inside films 68', 74' and the third and fourth outside films 70', 76' may have multiple layers that are cast, extruded, or otherwise created during the film manufacturing process, or alternatively may be multi-layer laminates that are created by laminating multiple films together to create any one of the third and fourth inside films 68', 74' and the third and fourth outside films 70', 76'. It should also be appreciated that various thicknesses of film(s) can be used, including without limitation, films having thicknesses of 0.0038 millimeters (i.e., 15 gauge film) and up.

Figures 6A, 6B:
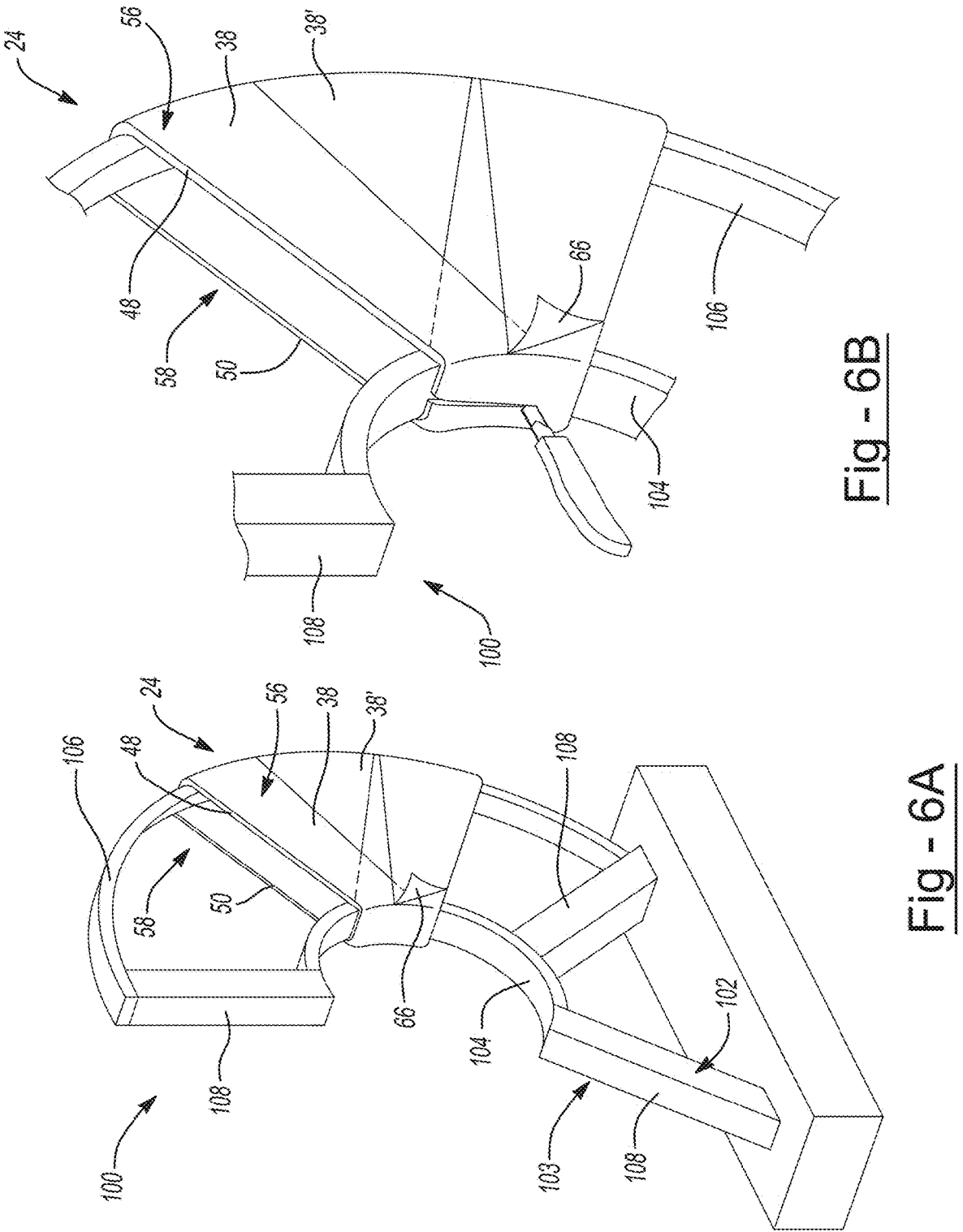
FIG. 6A is a front perspective view illustrating one step of an exemplary manufacturing process where the exemplary multi-layer packaging pad shown in FIG. 3A is being formed on a jig.
FIG. 6B is a side perspective view illustrating another step of the exemplary manufacturing process where windings of material forming the exemplary multi-layer packaging pad shown in FIG. 3A is being cut along an inner arc of the jig.

FIGS. 6A-6D illustrate a method for manufacturing the multi-layer packaging pad 24 shown in FIGS. 1 and 3A. As shown in FIG. 6A, the method includes the step of winding a sheet of material 38 around a jig 100 in an overlapping or partially overlapping arrangement such that multiple windings of the sheet of material 38, 38' form a multi-layer packaging pad 24 that is shaped like an annulus sector (i.e., a wedge-like shape). As explained above, the sheet of material may be a reinforced material 38, such as modified versions of the applicant's Panacea Wrap® and Panacea Wrap® Diamond multi-layer wrap materials. When the sheet of material is wound around the jig 100, a first ply 48 is formed on one side 102 of the jig 100 and a second ply 50 is formed on an opposite side 103 of the jig 100. Optionally, extra windings (i.e., layers) of the sheet of material 38, 38' may be would around the jig 100 at the center of the multi-layer packaging pad 24 to provide great material thickness and durability at that location. The jig 100 is formed by an inner arc 104 that may be curved and sized to match the inner diameter 34 of the metal coil 26 to be packaged, an outer arc 106 that may be curved and sized to match the outer diameter 30 of the metal coil 26, and one or more connecting members 108 that extend between and hold the inner and outer arcs 104, 106 in a radially spaced arrangement. The sheet of material 38 has a slip surface and is wound around the jig 100 with the slip surface facing out such that the first and second inside slip surfaces 56, 58 of the first and second plies 48, 50 are formed facing out away from the jig 100. The method includes formulating the slip surface of the sheet of material 38 such that the first and second inside slip surfaces 56, 58 have the ability to slide relative to one another.

FIG. 6A also illustrates the step of optionally placing a slip sheet 66 over the first inside slip surface 56 of the first ply 48. The method includes formulating the slip sheet 66 to have the ability to slide relative to the first and second inside slip surfaces 56, 58. As a result, the method may include using magnets, temporary fasteners, or tape to hold the slip sheet 66 against the first inside slip surface 56. It should be appreciated that alternatively, the slip sheet 66 may be placed over the second inside slip surface 58 of the second ply 50.

Figure 6C:
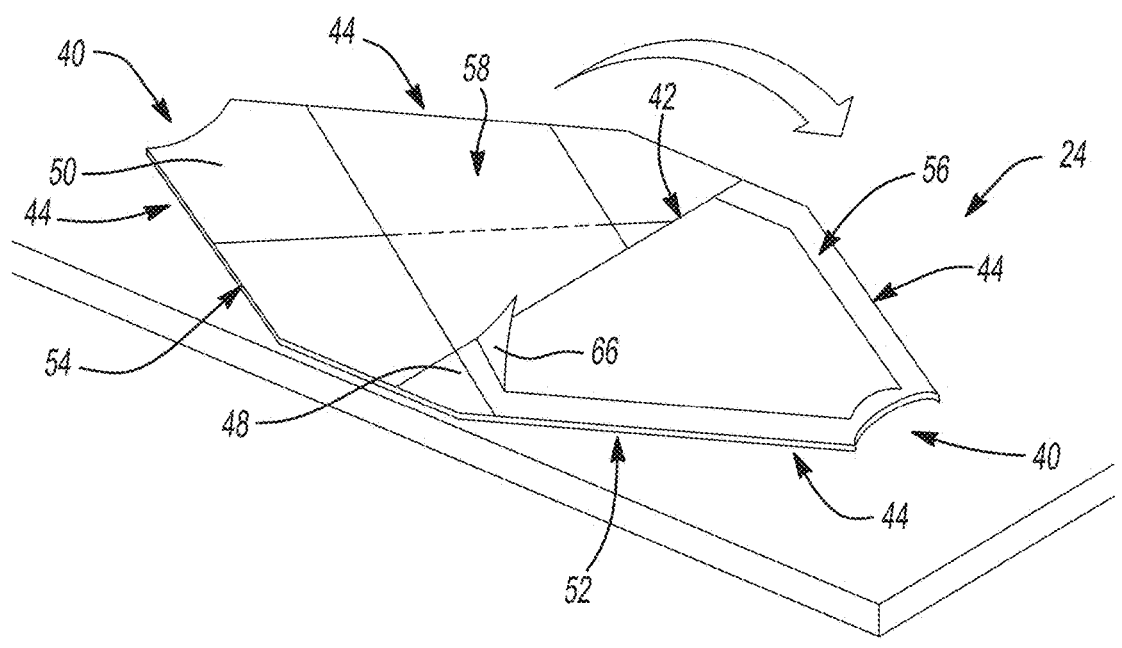
FIG. 6C is a front perspective view illustrating another step of the exemplary manufacturing process where the exemplary multi-layer packaging pad shown in FIG. 3A has been removed from the jig.
Figure 6D:
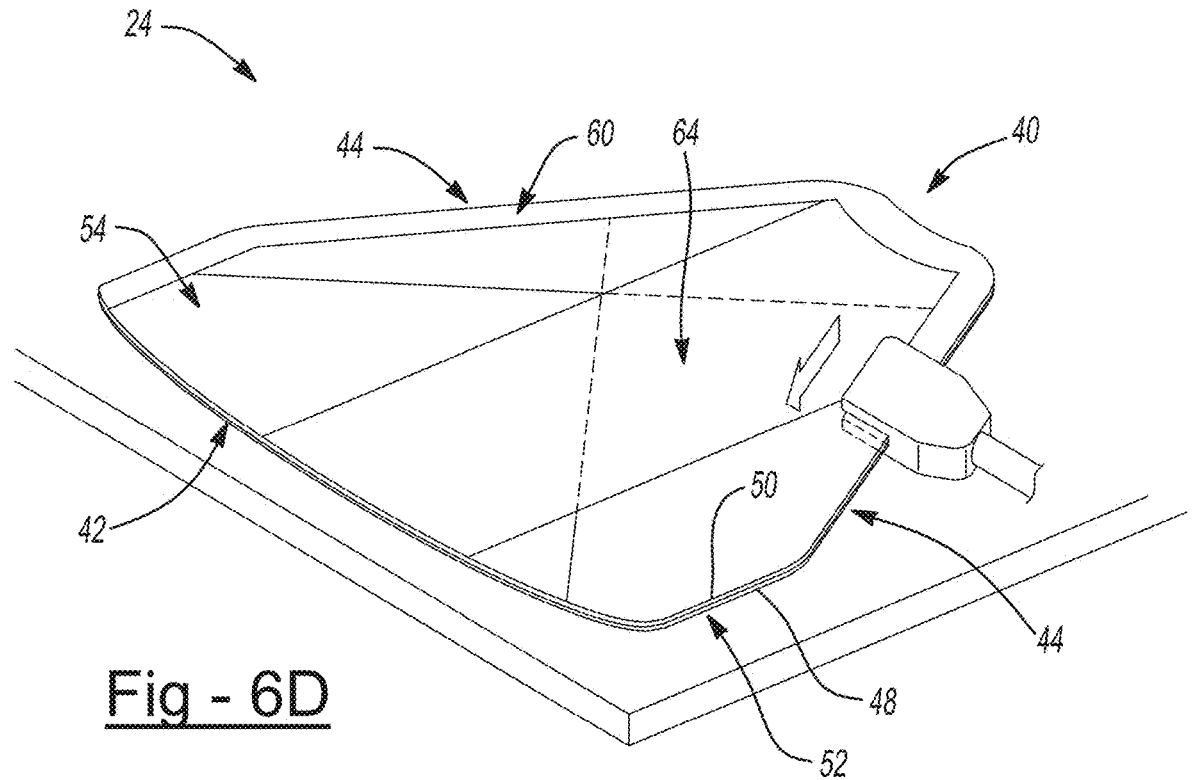
FIG. 6D is a front perspective view illustrating another step of the exemplary manufacturing process where the exemplary multi-layer packaging pad shown in FIG. 3A has been folded over back onto itself and secured using an edge sealing process.

As shown in FIG. 6B, the method proceeds with the step of cutting the multiple windings of the sheet along the inner arc 104 of the jig 100. However, it should be appreciated that the multiple windings of the sheet could alternatively be cut along the outer arc 106 instead of along the inner arc 104. As FIG. 6C illustrates, the method then involves the steps of removing the multi-layer packaging pad 24 from the jig 100 and folding the multi-layer packaging pad 24 back over onto itself such that the first and second inside slip surfaces 56, 58 face one another with the first and second plies 48, 50 arranged in an overlapping arrangement. As a result, the slip sheet 66 is positioned between the first and second inside slip surfaces 56, 58 of the first and second plies 48, 50 after the folding step. At this point, the multi-layer packaging pad 24 has a cut along the inner edge 40 (i.e., a cut edge), a fold along the outer edge 42 (i.e., a folded edge) opposite the cut edge, and a pair of side edges 44. The method thus proceeds with the step of sealing the first and second plies 48, 50 to one another along the cut edge and side edges 44 of the multi-layer packaging pad 24, leaving an unconstrained middle portion 64 where the second ply 50 is free to move or slide relative to the first ply 48, at least to some degree. The sealing step may be performed, for example, by using a heat sealer, ultrasonic welding, or pressure lamination to seal the cut edge and side edges 44 of the multi-layer packaging pad 24. Optionally, the folded edge may be sealed as well to help ensure that the multi-layer packaging pad 24 keeps its shape. The method may also include the step of formulating the sheet of material 38 to have a cling surface opposite the slip surface that faces out away from the first and second inside slip surfaces 56, 58 after the folding step. Alternatively, the method may include the step of applying an adhesive to the sheet of material 38, opposite the slip surface.

As shown in FIG. 1, the multi-layer packaging pad 24 may be used in a packaging method that comprises the steps of wrapping the metal coil 26 in a wrap material 22 and attaching the multi-layer packaging pad 24 to the wrap material 22 at a location that is positioned along one end 28 of the metal coil 26 between the inner and outer diameters 34, 30 such that the first ply 48 remains stationary relative to the wrap material 22 while an unconstrained middle portion 64 of the second ply 50 is moveable relative to the first ply 48 and the wrap material 22. As explained above, the metal coil 26 may be wrapped with the wrap material 22 by an automated coil wrap process using machines such as the CoilMaster® machine made by Signode Industrial Group LLC of Glenview, Illinois, the MEC DAGI® machine made by VCI Brasil of Bauru, Brazil, and the COIL SEAL machine made by Chadwick Engineering Ltd. of Kingston, Ontario. The wrap material 22 may thus be wrapped/wound around the metal coil 26 in a partially overlapping arrangement so that the entire metal coil 26 is wrapped in the wrap material 22.

The multi-layer packaging pad 24 can be applied to the metal coil 26 by sticking the inner pad surface 52 of the first ply 48 against the wrap material 22 on a pre-wrapped metal coil 26. As explained above, the multi-layer packaging pad 24 can be applied at a high wear location on the metal coil 26. For example, typical coil handling cranes have jaws that close on opposing ends 28 of the metal coil 26 from above until portions of the jaws enter the eye 36 of the metal coil 26. Sometimes the jaws cut, tear, puncture, or otherwise weaken the wrap material 22 where the jaws engage/grab the metal coil 26. As a result, the multi-layer packaging pads 24 disclosed herein may be placed on the opposing ends 28 of the metal coil 26 to cover locations above the eye 36 of the metal coil 26 (i.e., the 10 o'clock to 2 o'clock position) to protect the metal coil 26 and the wrap material 22 from damage by a crane or other lifting equipment. The metal coil 26 may then be turned, rolled, or inverted such that the multi-layer packaging pads 24 cover locations below the eye 36 of the metal coil 26 (i.e., the 4 o'clock to 8 o'clock position) to protect the metal coil 26 and the wrap material 22 from damage when chains or straps are inserted through the eye 36 to hold down and secure the metal coil 26 during transit. As another example, a rectangular multi-layer packaging pad 24 may be placed underneath the metal coil 26 along the outer cylindrical surface 32 to protect the wrap material 22 covering the belly (i.e., bottom side) of the metal coil 26 from abrasion damages due to harmonics and vibration during transit by rail car or flatbed truck, for example.

Figure 7A:
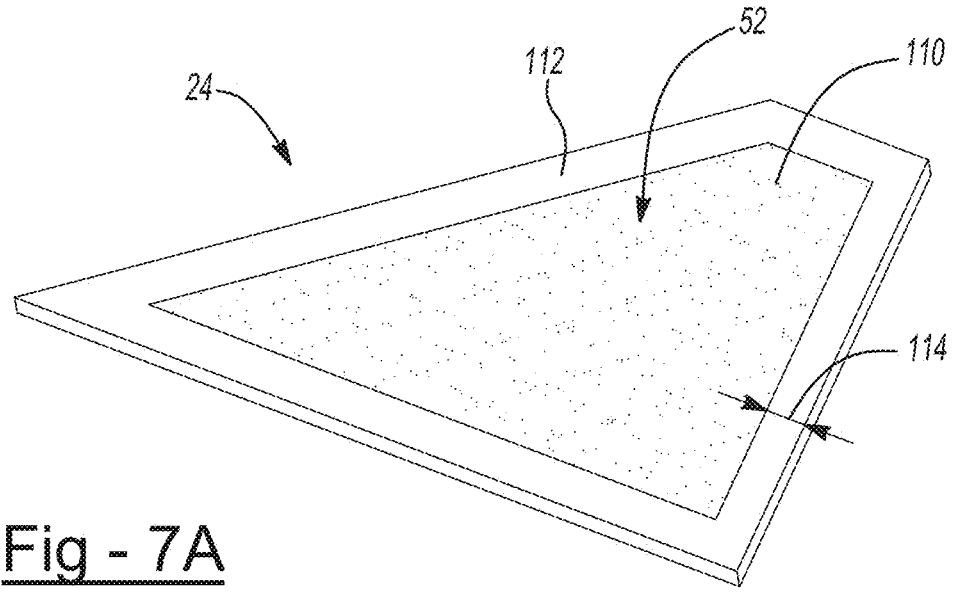
FIG. 7A is a top perspective view of another exemplary multi-layer packaging pad of the present disclosure where adhesive has been applied to an adhesive zone on an inner pad surface of the multi-layer packaging pad.
Figure 7B:
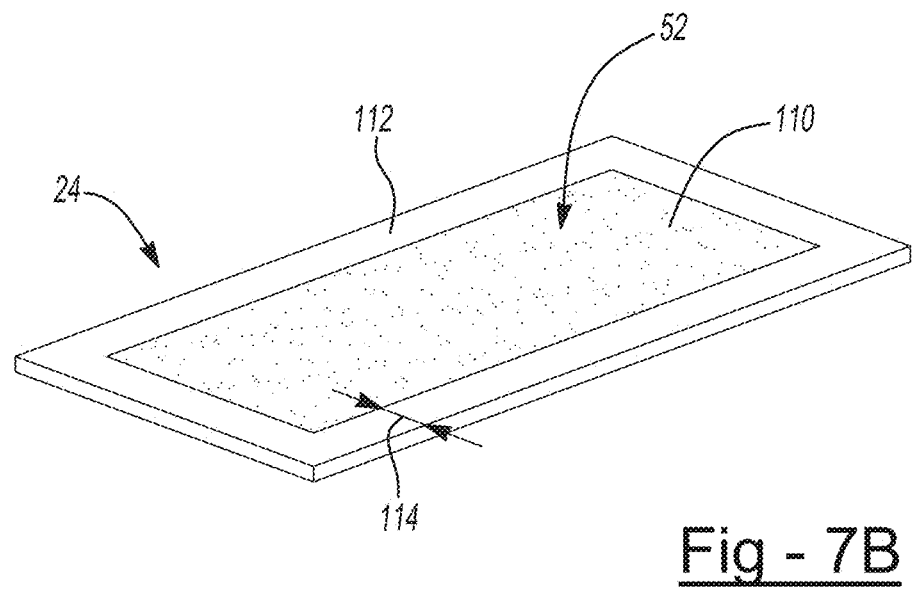
FIG. 7B is a top perspective view of another exemplary multi-layer packaging pad of the present disclosure where adhesive has been applied to an adhesive zone on the inner pad surface of the multi-layer packaging pad.

FIGS. 7A and 7B illustrate alternative shapes for the multi-layer packaging pads 24 disclosed herein. The multi-layer packaging pad 24 illustrated in FIG. 7A has a trapezoid shape, while the multi-layer packaging pad 24 illustrated in FIG. 7B has a square or rectangular shape. These shapes are conducive to a continuous-feed line manufacturing process such as that illustrated in FIG. 3C. The multi-layer packaging pads 24 shown in FIGS. 7A and 7B both include an adhesive zone 110 where an adhesive or cling additive is applied to the inner pad surface 52 of the multi-layer packaging pads 24 and an adhesive free edge 112, which does not have the adhesive of cling additive. The adhesive free edge 112 may have, for example, a width 114 of at least half an inch (i.e., greater than or equal to 0.5 inches). When the multi-layer packaging pads 24 shown in FIGS. 7A and 7B are applied to the wrap material 22 on a pre-wrapped object, such as the metal coil 26 illustrated in FIG. 1, the adhesive zone 110 engages and adheres to the wrap material 22 while the adhesive free edge 112 remains loose and un-adhered to the wrap material 22. As will be explained below, the width 114 of the adhesive free edge 112 allows for additional shear travel of the second ply 50 relative to the first ply 48 because the adhesive free edge 112 can pull up and/or curl away from the wrap material 22.

Figure 8A:
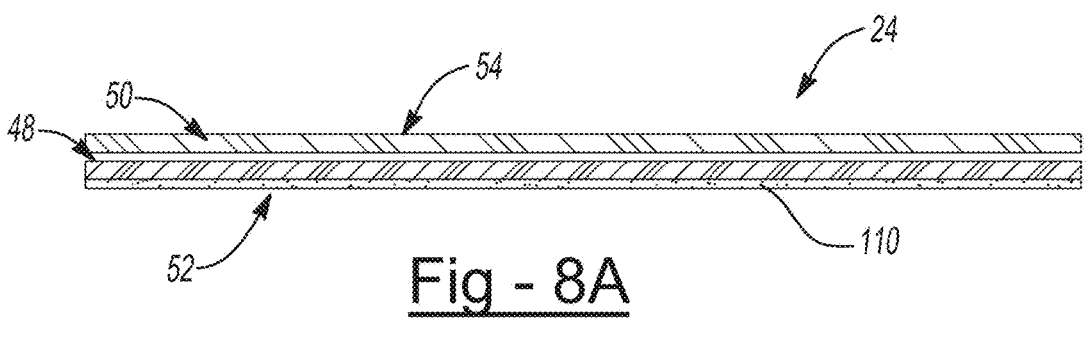
FIG. 8A is a side cross-sectional view of another exemplary multi-layer packaging pad where adhesive has been applied across the entire inner pad surface of the multi-layer packaging pad.
Figure 8B:
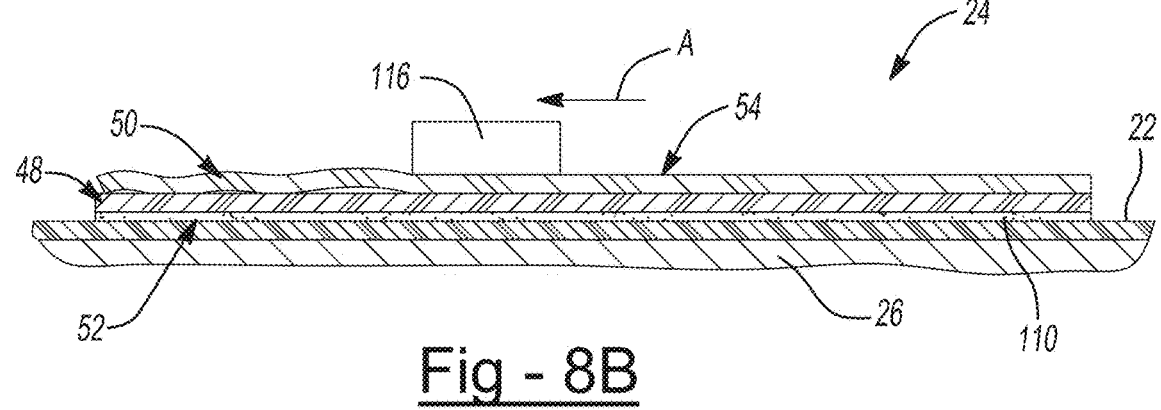
FIG. 8B is another side cross-sectional view of the multi-layer packaging pad shown in FIG. 8A that illustrates movement of the multi-layer packaging pad when acted on by a crane or other external object.

FIG. 8A is a side cross-sectional view of a multi-layer packaging pad 24 where the adhesive zone 110 extends across the entire inner pad surface 52 of the first ply 48. FIG. 8B shows the multi-layer packaging pad 24 after it has been applied to the wrap material 22 on a pre-wrapped metal coil 26. Arrow A in FIG. 8B illustrates the movement of a crane or other external object 116, which contacts the outer pad surface 54 of the multi-layer packaging pad 24. The adhesive zone 110 holds the first ply 48 in place, but friction between the external object 116 and the outer pad surface 54 of the multi-layer packaging pad 24 during movement of the external object 116 along arrow A causes the second ply 50 to move relative to first ply 48 and causes the second ply 50 to buckle or ripple to the left of the external object 116 while stretching in tension to the right of the external object 116. If the tension becomes too great, the second ply 50 may rip, tear, or otherwise fail.

Figure 9A:
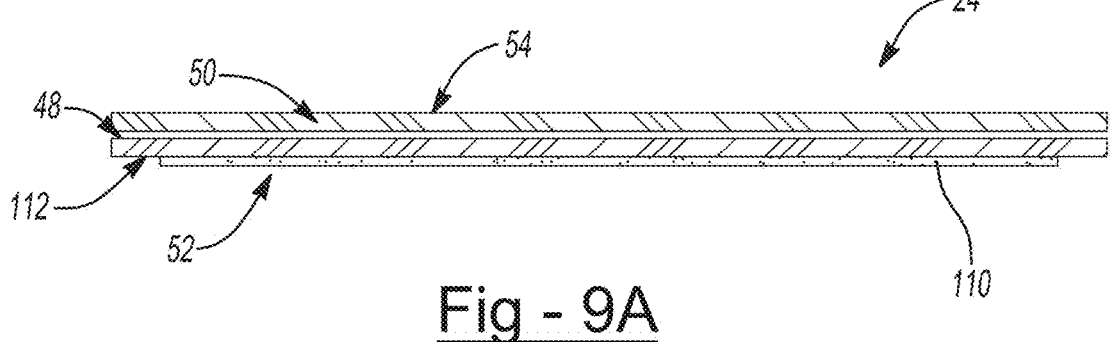
FIG. 9A is a side cross-sectional view of one of the exemplary multi-layer packaging pads shown in FIGS. 7A and 7B.
Figure 9B:
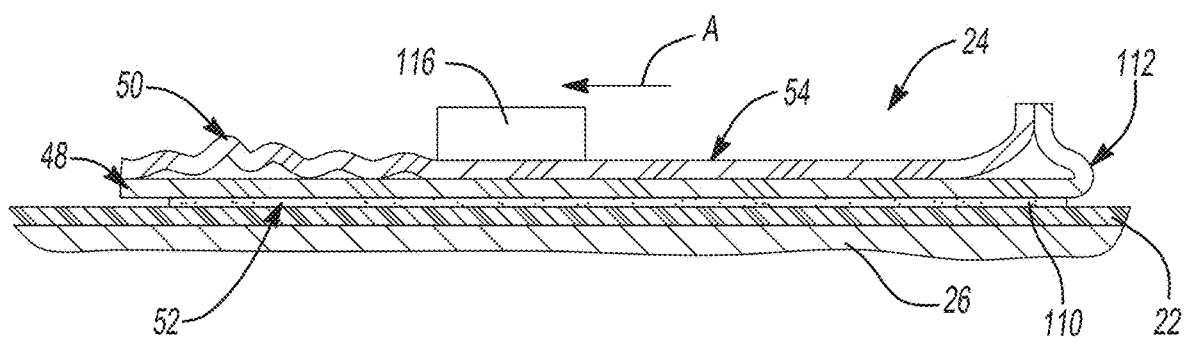
FIG. 9B is another side cross-sectional view of the multi-layer packaging pad shown in FIG. 9A that illustrates movement of the multi-layer packaging pad when acted on by a crane or other external object.

FIG. 9A is a side cross-sectional view of a multi-layer packaging pad 24 where the adhesive zone 110 on the inner pad surface 52 of the first ply 48 is bordered by an adhesive free edge 112. FIG. 9B shows this multi-layer packaging pad 24 after it has been applied to the wrap material 22 on a pre-wrapped metal coil 26. Arrow A in FIG. 9B illustrates the movement of a crane or other external object 116, which contacts the outer pad surface 54 of the multi-layer packaging pad 24. Like in the previous example, the adhesive zone 110 holds the first ply 48 in place, but friction between the external object 116 and the outer pad surface 54 of the multi-layer packaging pad 24 during movement of the external object 116 along arrow A causes the second ply 50 to move relative to the first ply 48 and causes the second ply 50 to buckle or ripple to the left of the external object 116. However, the second ply 50 in this example does not stretch as much to the right of the external object 116 because the adhesive free edge 112 can pull up and/or curl away from the wrap material 22. In other words, since the adhesive free edge 112 is not adhered to the wrap material 22, the second ply 50 in the configuration shown in FIGS. 9A and 9B is free to move in shear relative to the first ply 48 in the same direction as arrow A along a longer travel distance compared to the configuration shown in FIGS. 8A and 8B before becoming excessively stretched. It should be appreciated that the direction of movement shown by arrow A may point in the opposite direction and that the orientation of the multi-layer packaging pads 24 and pre-wrapped metal coils 26 illustrated in FIGS. 8B and 9B are merely exemplary and may be oriented differently in practice, including for example, orientations where the multi-layer packaging pad 24 and arrow A are vertically oriented.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims. In addition, the steps of the method set forth herein may be practiced in a different order than that listed herein.

What is claimed is:

1. A multi-layer packaging pad, comprising:
   a first ply including an inner pad surface;
   a second ply including an outer pad surface;

said first and second plies disposed in an overlapping arrangement with said outer pad surface of said second ply facing out away from said inner pad surface of said first ply, and said inner pad surface of said first ply including cling properties or an adhesive, wherein each of said first and second plies is a multi-layer film laminate comprising multiple sheets of reinforced material each containing reinforcing ribs, wherein said reinforcing ribs in said first ply include a plurality of longitudinal ribs that run in a longitudinal direction of said first ply, wherein said reinforcing ribs in said second ply include a plurality of cross-direction ribs that have the same construction as said longitudinal ribs in said first ply and that run in a cross-direction that is perpendicular or oblique to said longitudinal direction of said first ply, wherein said sheets of reinforced material are disposed in an overlapping or partially overlapping arrangement at different angular orientations such that said plurality of longitudinal ribs of said first ply extend in a different directions relative to said cross-direction ribs of said second ply to provide a multi-axial rib overlap across said first and second plies.

2. The multi-layer packaging pad as set forth in claim 1, wherein said reinforcing ribs in each of said first and second plies include transverse ribs that are arranged at an oblique angle relative to said longitudinal ribs in said first ply and said cross-direction ribs in said second ply.

3. The multi-layer packaging pad as set forth in claim 2, wherein each of said longitudinal ribs comprises a braid of interwoven rib tapes, each of said cross-direction ribs comprises a braid of interwoven rib tapes, and each of said transverse ribs comprise a single rib tape that passes through said braid of interwoven rib tapes at evenly spaced mesh points.

4. The multi-layer packaging pad as set forth in claim 1, wherein said reinforcing ribs create a diamond-shaped pattern that extends at least partially across a width of said sheet of reinforced material.

5. The multi-layer packaging pad as set forth in claim 1, wherein said sheets of reinforced material are arranged in an overlapping or partially overlapping arrangement such that said multi-layer packaging pad is shaped like an annulus sector or a trapezoid.

6. The multi-layer packaging pad as set forth in claim 1, wherein said sheets of reinforced material are arranged in an overlapping or partially overlapping arrangement such that said multi-layer packaging pad is shaped like an annulus.

7. The multi-layer packaging pad as set forth in claim 1, further comprising:

a first slip sheet positioned between said first and second plies, wherein said first slip sheet includes at least one slip surface that is formulated to permit sliding between said first slip sheet and at least a middle portion of one of said first and second plies.

8. The multi-layer packaging pad as set forth in claim 7, wherein each of said first and second plies comprises an inside film and an outside film and wherein said reinforcing ribs are disposed between said inside and outside films.

9. The multi-layer packaging pad as set forth in claim 8, wherein said inside film defines one of said first and second inside slip surfaces opposite an inside film cling surface and wherein said outside film includes an outside film cling surface that is arranged in cling engagement with said inside film cling surface through spaces between said reinforcing ribs.

10. The multi-layer packaging pad as set forth in claim 9, wherein said first slip sheet includes a third slip surface that faces said first inside slip surface of said first ply and a fourth slip surface that faces said second inside slip surface of said second ply and wherein said first inside slip surface of said first ply and said third slip surface of said first slip sheet are formulated to slide relative to one another and said second inside slip surface of said second ply and said fourth slip surface of said first slip sheet are formulated to slide relative to one another.

11. The multi-layer packaging pad as set forth in claim 10, wherein at portion of said first slip sheet is unconstrained and is moveable relative to said first and second plies to define a slip region between said first and second plies.

12. The multi-layer packaging pad as set forth in claim 11, further comprising:

a third ply disposed in an overlapping arrangement with one of said inner pad surface of said first ply and said outer pad surface of said second ply;

said third ply being connected to said first and second plies at said sealed perimeter of said multi-layer packaging pad to provide a second slip region between said third ply and one of said first and second plies; and a second slip sheet positioned in said second slip region between said third ply and one of said first and second plies, said slip sheet including a fifth slip surface that is formulated to slide relative to one of said first and second plies and a sixth slip surface that is formulated to slide relative to said third ply.

13. The multi-layer packaging pad as set forth in claim 1, wherein said inner pad surface of said first ply includes an adhesive free edge.

14. The multi-layer packaging pad as set forth in claim 13, wherein said adhesive free edge has a width of at least 0.5 inches.

15. The multi-layer packaging pad as set forth in claim 13, wherein there is no adhesive or cling properties on said inner pad surface of said first ply along said adhesive free edge, said adhesive free edge circumscribes an adhesive zone, and said inner pad surface of said first ply includes said cling properties or adhesive in said adhesive zone.

* * * * *